(12) United States Patent
Mogi et al.

(10) Patent No.: US 10,385,418 B2
(45) Date of Patent: Aug. 20, 2019

(54) GRAIN-ORIENTED ELECTRICAL STEEL SHEET

(71) Applicant: NIPPON STEEL & SUMITOMO METAL CORPORATION, Tokyo (JP)

(72) Inventors: Hisashi Mogi, Yachiyo (JP); Fumiaki Takahashi, Kisarazu (JP); Hideyuki Hamamura, Futtsu (JP); Tatsuhiko Sakai, Oita (JP); Hirofumi Imai, Kisarazu (JP); Shunsuke Okumura, Kitakyusyu (JP)

(73) Assignee: NIPPON STEEL CORPORATION, Tokyo (JP)

( * ) Notice: Subject to any disclaimer, the term of this patent is extended or adjusted under 35 U.S.C. 154(b) by 112 days.

(21) Appl. No.: 15/554,555

(22) PCT Filed: Apr. 19, 2016

(86) PCT No.: PCT/JP2016/062356
§ 371 (c)(1),
(2) Date: Aug. 30, 2017

(87) PCT Pub. No.: WO2016/171124
PCT Pub. Date: Oct. 27, 2016

(65) Prior Publication Data
US 2018/0066334 A1  Mar. 8, 2018

(30) Foreign Application Priority Data
Apr. 20, 2015 (JP) ................................. 2015-086299

(51) Int. Cl.
*C21D 9/46* (2006.01)
*H01F 1/147* (2006.01)
(Continued)

(52) U.S. Cl.
CPC .............. *C21D 9/46* (2013.01); *B23K 26/364* (2015.10); *C21D 3/04* (2013.01); *C21D 6/004* (2013.01);
(Continued)

(58) Field of Classification Search
CPC .......... H01F 1/16; H01F 1/18; H01F 1/14783; C22C 38/00; C22C 38/02; C22C 38/04; C22C 38/34; B32B 3/28; B32B 3/30
See application file for complete search history.

(56) References Cited

U.S. PATENT DOCUMENTS

| | | | |
|---|---|---|---|
| 2009/0145526 A1 | 6/2009 | Arai et al. | |
| 2013/0139932 A1 | 6/2013 | Sakai et al. | |
| 2014/0338792 A1 | 11/2014 | Takajo et al. | |

FOREIGN PATENT DOCUMENTS

| | | |
|---|---|---|
| CN | 100557725 C | 11/2009 |
| CN | 104093870 A | 10/2014 |

(Continued)

OTHER PUBLICATIONS

Russian Office Action and Search Report, dated Oct. 1, 2018, for Russian Application No. 2017133789.02, with an English translation.
(Continued)

*Primary Examiner* — Catherine A. Simone
(74) *Attorney, Agent, or Firm* — Birch, Stewart, Kolasch & Birch, LLP

(57) ABSTRACT

Provided is a grain-oriented electrical steel sheet including a steel sheet having a steel sheet surface in which a groove, which extends in a direction intersecting a rolling direction and of which a groove depth direction matches a sheet thickness direction, is formed. In a case where the groove is seen on a longitudinal groove cross-section including a groove extension direction and the sheet thickness direction,
(Continued)

an arithmetic average height Ra of a roughness curve, which constitutes a contour of a groove bottom region of the groove, is 1 μm to 3 μm, and an average length RSm of a roughness curve element, which constitutes the contour of the groove bottom region, is 10 μm to 150 μm.

4 Claims, 12 Drawing Sheets

(51) Int. Cl.
<table>
<tr><td>C22C 38/00</td><td>(2006.01)</td></tr>
<tr><td>C22C 38/04</td><td>(2006.01)</td></tr>
<tr><td>C22C 38/06</td><td>(2006.01)</td></tr>
<tr><td>C22C 38/34</td><td>(2006.01)</td></tr>
<tr><td>C22C 38/42</td><td>(2006.01)</td></tr>
<tr><td>C22C 38/60</td><td>(2006.01)</td></tr>
<tr><td>H01F 1/16</td><td>(2006.01)</td></tr>
<tr><td>H01F 1/18</td><td>(2006.01)</td></tr>
<tr><td>C21D 3/04</td><td>(2006.01)</td></tr>
<tr><td>C21D 6/00</td><td>(2006.01)</td></tr>
<tr><td>C21D 8/00</td><td>(2006.01)</td></tr>
<tr><td>C21D 8/12</td><td>(2006.01)</td></tr>
<tr><td>B23K 26/364</td><td>(2014.01)</td></tr>
<tr><td>B23K 103/04</td><td>(2006.01)</td></tr>
<tr><td>B23K 26/359</td><td>(2014.01)</td></tr>
</table>

(52) U.S. Cl.
CPC ............. *C21D 6/005* (2013.01); *C21D 6/008* (2013.01); *C21D 8/005* (2013.01); *C21D 8/12* (2013.01); *C21D 8/1255* (2013.01); *C21D 8/1261* (2013.01); *C21D 8/1283* (2013.01); *C22C 38/00* (2013.01); *C22C 38/001* (2013.01); *C22C 38/002* (2013.01); *C22C 38/008* (2013.01); *C22C 38/04* (2013.01); *C22C 38/06* (2013.01); *C22C 38/34* (2013.01); *C22C 38/42* (2013.01); *H01F 1/14783* (2013.01); *H01F 1/16* (2013.01); *H01F 1/18* (2013.01); *B23K 26/359* (2015.10); *B23K 2103/04* (2018.08); *C22C 38/60* (2013.01); *C22C 2202/02* (2013.01)

(56) References Cited

FOREIGN PATENT DOCUMENTS

<table>
<tr><td>JP</td><td>62-53579 B2</td><td>11/1987</td></tr>
<tr><td>JP</td><td>62-54873 B2</td><td>11/1987</td></tr>
<tr><td>JP</td><td>6-57335 A</td><td>3/1994</td></tr>
<tr><td>JP</td><td>6-116642 A</td><td>4/1994</td></tr>
<tr><td>JP</td><td>7-268474 A</td><td>10/1995</td></tr>
<tr><td>JP</td><td>2007-2334 A</td><td>1/2007</td></tr>
<tr><td>JP</td><td>2007-51314 A</td><td>3/2007</td></tr>
<tr><td>JP</td><td>2007-169762 A</td><td>7/2007</td></tr>
<tr><td>RU</td><td>2509163 C1</td><td>3/2014</td></tr>
<tr><td>RU</td><td>2509164 C1</td><td>3/2014</td></tr>
<tr><td>RU</td><td>2531213 C1</td><td>10/2014</td></tr>
<tr><td>WO</td><td>WO 2006/120985 A1</td><td>11/2006</td></tr>
<tr><td>WO</td><td>WO 2012/165393 A1</td><td>12/2012</td></tr>
</table>

OTHER PUBLICATIONS

Extended European Search Report dated Oct. 15, 2018 for Counterpart Application No. 16783145.2.
Chinese Office Action and Search Report, dated Aug. 2, 2018 for corresponding Chinese Application No. 201680012998.4, with an English translation of the Chinese Search Report.
International Search Report for PCT/JP2016/062356 dated Aug. 2, 2016.
Written Opinion of the International Searching Authority for PCT/JP2016/062356 (PCT/ISA/237) dated Aug. 2, 2016.
Korean Notice of Allowance, dated May 15, 2019, for Application No. 10-2017-7024040, with an English translation.

GRAIN-ORIENTED ELECTRICAL STEEL SHEET

TECHNICAL FIELD OF THE INVENTION

The present invention relates to a grain-oriented electrical steel sheet.

Priority is claimed on Japanese Patent Application No. 2015-086299, filed on Apr. 20, 2015, the content of which is incorporated herein by reference.

RELATED ART

In the related art, as a steel sheet for an iron core of a transformer, there is known a grain-oriented electrical steel sheet that exhibits excellent magnetic characteristics in a specific direction. The grain-oriented electrical steel sheet is a steel sheet in which a crystal orientation is controlled so that a magnetization easy axis of a crystal grain and a rolling direction match each other by a combination of a cold rolling treatment and an annealing treatment. It is preferable that an iron loss of the grain-oriented electrical steel sheet is as small as possible.

The iron loss is classified into an eddy current loss and a hysteresis loss. In addition, the eddy current loss is classified into a classical eddy current loss and an anomalous eddy current loss. Typically, there is known a grain-oriented electrical steel sheet in which an insulating film is formed on a surface of a steel sheet (base metal) of which a crystal orientation is controlled as described above so as to reduce the classical eddy current loss. The insulating film also plays a role of applying electrical insulating properties, tensile strength, heat resistance, and the like to the steel sheet. Furthermore, recently, there is also known a grain-oriented electrical steel sheet in which a glass film is formed between the steel sheet and the insulating film.

On the other hand, as a method of reducing the anomalous eddy current loss, there is known a magnetic domain control method of narrowing a width of a 180° magnetic domain (performing refinement of the 180° magnetic domain) by forming a strain, which extends in a direction intersecting the rolling direction, at a predetermined interval along the rolling direction. The magnetic domain control method is classified into a non-destructive magnetic domain control method in which the strain is applied to the steel sheet of the grain-oriented electrical steel sheet by non-destructive means, and a destructive magnetic domain control method in which a groove is formed in a surface of the steel sheet as an example.

In a case of manufacturing a wound core for a transformer by using the grain-oriented electrical steel sheet, it is necessary to perform a stress relief annealing treatment so as to remove a deformation strain that occurs when the grain-oriented electrical steel sheet is coiled in a coil shape. In a case of manufacturing the wound core by using a grain-oriented electrical steel sheet to which a strain is applied by using the non-destructive magnetic domain control method, the strain is disappeared due to execution of the stress relief annealing treatment. Therefore, a magnetic domain refinement effect (that is, an anomalous eddy current loss reducing effect) is also lost.

On the other hand, in a case of manufacturing the wound core by using a grain-oriented electrical steel sheet to which a groove is formed in accordance with the destructive magnetic domain control method, the groove is not lost due to execution of the stress relief annealing treatment. Accordingly, it is possible to maintain the magnetic domain refinement effect. As a result, as a method of reducing the anomalous eddy current loss, the destructive magnetic domain control method is typically employed with respect to the wound core. Furthermore, in a case of manufacturing the stacked core for a transformer, a problem such as a deformation strain of the wound core does not occur. Accordingly, it is possible to selectively employ any one of the non-destructive magnetic domain control method and the destructive magnetic domain control method.

As the destructive magnetic domain control method, typically, there are known an electrolytic etching method in which a groove is formed in a steel sheet surface of the grain-oriented electrical steel sheet through the electrolytic etching method (refer to Patent Document 1), a gear press method in which a groove is formed in a steel sheet surface by mechanically pressing a gear on the steel sheet surface of the grain-oriented electrical steel sheet (refer to Patent Document 2), and a laser irradiation method in which a groove is formed in a steel sheet surface of the grain-oriented electrical steel sheet through laser irradiation (refer to Patent Document 3).

In the electrolytic etching method, for example, an insulating film (or a glass film) on the steel sheet surface is removed in a linear shape with a laser or mechanical means, and then electrolytic etching is performed with respect to a portion at which the steel sheet is exposed, thereby forming a groove in the steel sheet surface. In a case of employing the electrolytic etching method, a process of manufacturing the grain-oriented electrical steel sheet becomes complicated. Therefore, there is a problem that the manufacturing cost increases. In addition, in the gear press method, since the steel sheet that is the grain-oriented electrical steel sheet is a very hard steel sheet containing 3 mass % of Si, abrasion and damage of the gear are likely to occur. In a case of employing the gear press method, when the gear is abraded, a difference occurs in a groove depth. Therefore, there is a problem that it is difficult to sufficiently attain the anomalous eddy current loss reducing effect.

On the other hand, in a case of employing the laser irradiation method, it is possible to form a groove in the steel sheet surface in a relatively easy and stable manner. Accordingly, the problem related to the electrolytic etching method and the problem related to the gear press method do not occur. Accordingly, recently, the laser irradiation method is widely employed as the magnetic domain control method of the grain-oriented electrical steel sheet.

PRIOR ART DOCUMENT

Patent Document

[Patent Document 1] Japanese Examined Patent Application, Second Publication No. S62-54873
[Patent Document 2] Japanese Examined Patent Application, Second Publication No. S62-53579
[Patent Document 3] Japanese Unexamined Patent Application, First Publication No. H6-57335

DISCLOSURE OF THE INVENTION

Problems to be Solved by the Invention

In a case of employing the laser irradiation method as the magnetic domain control method of the grain-oriented electrical steel sheet, as an example of manufacturing process, after the insulating film is formed on a surface of the steel sheet, the surface of the steel sheet is irradiated with a laser from an upper side of the insulating film to form a groove on the surface of the steel sheet. In this case, the groove immediately after the laser irradiation is exposed to the outside. Therefore, it is necessary to form the insulating film on the steel sheet again after forming the groove so as to prevent occurrence of rust in the groove.

The thickness of the insulating film in a region in which the groove is formed is larger than the thickness of the insulating film in another region. Therefore, adhesiveness between the steel sheet and the insulating film in the region in which the groove is formed becomes poorer in comparison to the other region. As a result, cracking or peeling-off is likely to occur in the insulating film at the periphery of the groove. When the cracking or peeling-off occurs in the insulating film, rust is likely to occur on the steel sheet.

As described above, in a case of employing the laser irradiation method as the magnetic domain control method of the grain-oriented electrical steel sheet, there is a problem that rust resistance of the grain-oriented electrical steel sheet deteriorates. For example, when rust occurs, a film at the periphery of the rust is peeled off, and in a case where an interlayer current significantly flows, an iron loss may increase. In addition, in a case where the steel sheet is eroded due to rust, a non-magnetic portion is diffused, and optimal magnetic domain refinement conditions may not be maintained in some cases.

Furthermore, even in a case of employing a manufacturing process in which a groove is formed in a surface of the steel sheet through laser irradiation before the insulating film is formed on the surface of the steel sheet, and then the insulating film is formed on the surface of the steel sheet, the above-described problem occurs.

The invention has been made in consideration of the above-described problems, and an object thereof is to improve rust resistance of a grain-oriented electrical steel sheet in which a groove is formed in a surface of a steel sheet for magnetic domain refinement.

Means for Solving the Problem

The gist of the invention is as follows.

(1) According to an aspect of the invention, there is provided a grain-oriented electrical steel sheet including a steel sheet having a steel sheet surface in which a groove, which extends in a direction intersecting a rolling direction and of which a groove depth direction matches a sheet thickness direction, is formed. In a case where the groove is seen on a longitudinal groove cross-section including a groove extension direction and the sheet thickness direction, an arithmetic average height Ra of a roughness curve, which constitutes a contour of a groove bottom region of the groove, is 1 μm to 3 μm, and an average length RSm of a roughness curve element, which constitutes the contour of the groove bottom region, is 10 μm to 150 μm. The grain-oriented electrical steel sheet further includes an insulating film. In a case where the groove is seen on a transverse groove cross-section that is perpendicular to the groove extension direction, when a region, which is spaced away from a base point, that is a boundary between the groove and the steel sheet surface, by 10 μm to 500 μm in a direction that is perpendicular to the sheet thickness direction and points away from the groove on the transverse groove cross-section, is defined as a particle existing region, the insulating film in the particle existing region includes iron-containing particles having an equivalent circle diameter of 0.1 μm to 2 μm. A ratio of an area of the iron-containing particles to an area of the particle existing region is equal to or greater than 0.1% and less than 30%, and a chemical composition of the iron-containing particles contains 80 to 100 mass % of Fe, and 0 to 10 mass % of Si, and 0 to 10 mass % of Mg.

(2) The grain-oriented electrical steel sheet according to (1) may further include a glass film that is provided between the steel sheet and the insulating film. In this case, when a region in the glass film and the insulating film, in which a Mg content is an average of 1.3 or more times an average Mg content in the glass film and the insulating film in terms of a mass fraction, is defined as a Mg-concentrated region, in a case where the groove is seen on the transverse groove cross-section that is perpendicular to the groove extension direction, the Mg-concentrated region may be included in a region spaced away from a base point, that is a boundary between the groove and the steel sheet surface, by 0.1 μm to 10 μm in a direction that is perpendicular to the sheet thickness direction and points away from the groove on the transverse groove cross-section. In addition, in a case where the groove is seen from the sheet thickness direction, the Mg-concentrated region continuously may exist along the groove extension direction, or a plurality of the Mg-concentrated regions may exist with an interval along the groove extension direction such that a distance between the Mg-concentrated regions adjacent to each other along the groove extension direction is greater than 0 and equal to or less than 100 μm.

(3) In the grain-oriented electrical steel sheet according to (2), the glass film having an average thickness of 0 μm to 5 μm and the insulating film having an average thickness of 1 μm to 5 μm may be formed on the groove, the glass film having an average thickness of 0.5 μm to 5 μm and the insulating film having an average thickness of 1 μm to 5 μm may be formed on the steel sheet, and the average thickness of the glass film that is formed on the groove may be smaller than the average thickness of the glass film that is formed on the steel sheet.

(4) In the grain-oriented electrical steel sheet according to any one of (1) to (3), in the steel sheet, a grain size of a crystal grain that is in contact with the groove may be 5 μm or greater.

Effects of the Invention

According to the aspect of the invention, it is possible to improve rust resistance of a grain-oriented electrical steel sheet in which a groove is formed in a surface of a steel sheet for magnetic domain refinement.

BRIEF DESCRIPTION OF THE DRAWINGS

FIG. 8 is a schematic view illustrating a roughness curve RC that constitutes a contour of the groove bottom region 5a.

EMBODIMENTS OF THE INVENTION

Hereinafter, a preferred embodiment of the invention will be described in detail. However, the invention is not limited to configurations disclosed in this embodiment, and various modifications can be made in a range not departing from the gist of the invention. In addition, the lower limit and the upper limit are also included in numerical value limiting ranges to be described later.

However, the lower limit is not included in a numerical value limiting range that is described as "greater than" the lower limit, and the upper limit is not included in a numerical value limiting range that is described as "less than" the upper limit.

Hereinafter, an embodiment of the invention will be described in detail with reference to the accompanying drawings.

Figure 1:
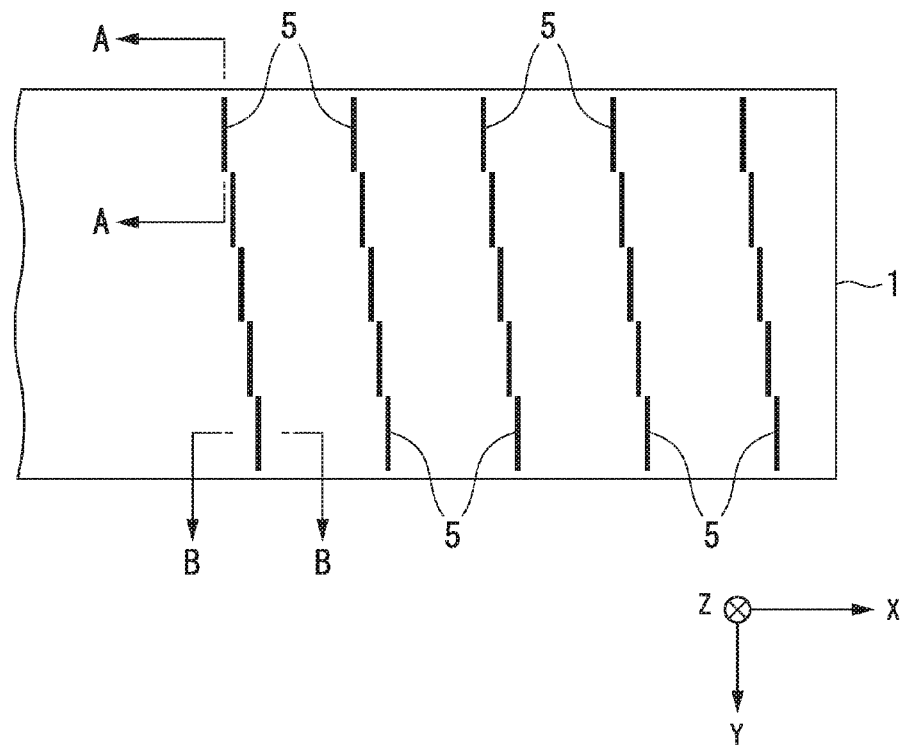
FIG. 1 is a plan view of a grain-oriented electrical steel sheet 1 according to an embodiment of the invention.
Figure 2:
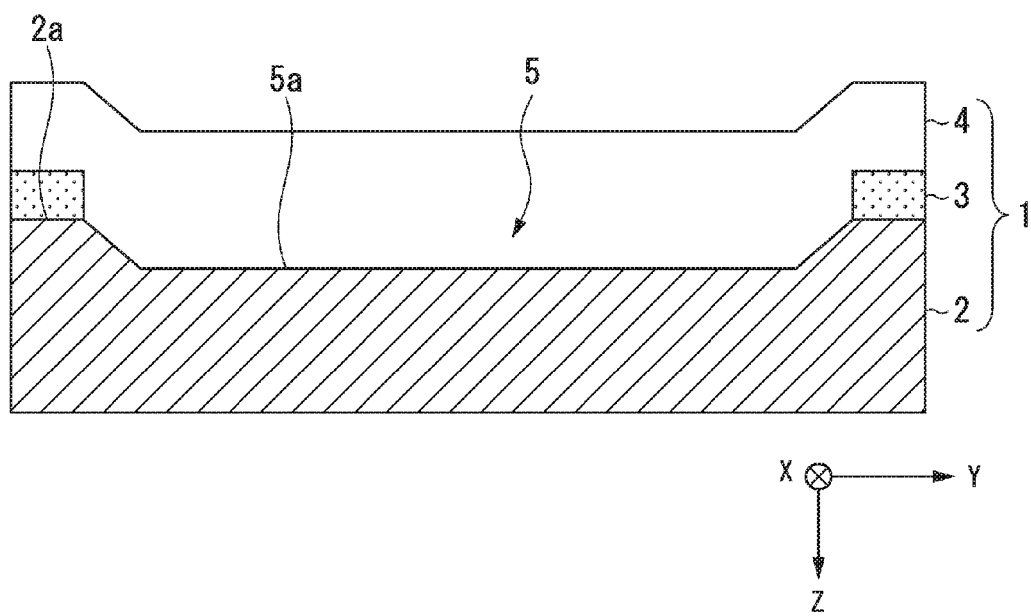
FIG. 2 is an arrow cross-sectional view taken along line A-A in FIG. 1 (view when a groove 5 is seen on a cross-section including a groove extension direction).
Figure 3:
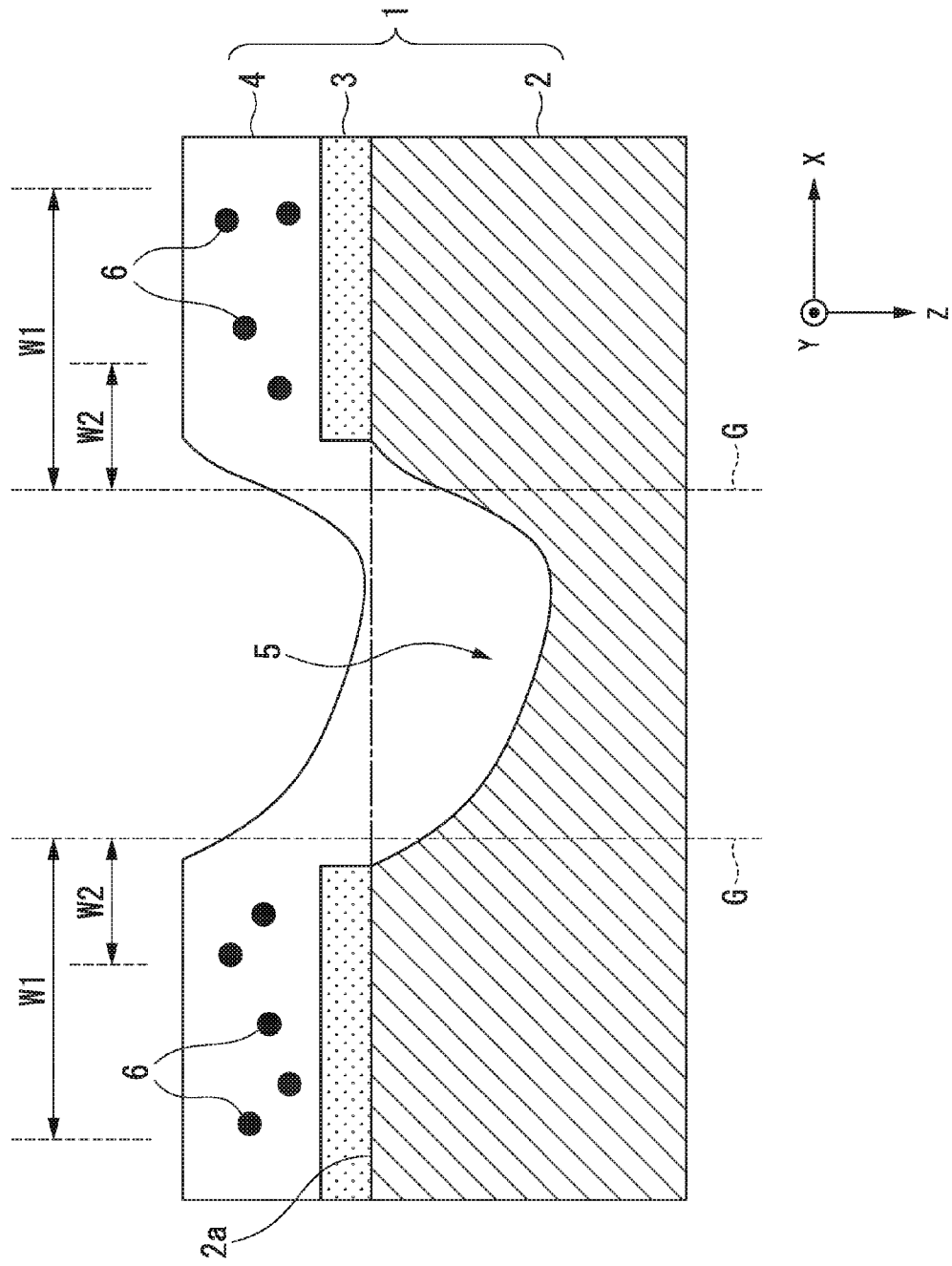
FIG. 3 is an arrow cross-sectional view taken along line B-B in FIG. 1 (view when the groove 5 is seen on a cross-section that is perpendicular to the groove extension direction).

FIG. 1 is a plan view of a grain-oriented electrical steel sheet 1 according to this embodiment. FIG. 2 is an arrow cross-sectional view taken along line A-A in FIG. 1. FIG. 3 is an arrow cross-sectional view taken along line B-B in FIG. 1. Furthermore, In FIG. 1 to FIG. 3, a rolling direction of the grain-oriented electrical steel sheet 1 is defined as X, a sheet width direction (direction perpendicular to the rolling direction in the same plane) of the grain-oriented electrical steel sheet 1 is defined as Y, and a sheet thickness direction (direction perpendicular to an XY plane) of the grain-oriented electrical steel sheet 1 is defined as Z.

As illustrated in FIGS. 1 to 3, the grain-oriented electrical steel sheet 1 includes a steel sheet (base metal) 2 in which a crystal orientation is controlled by a combination of a cold-rolling treatment and an annealing treatment so that a magnetization easy axis of a crystal grain and the rolling direction X match each other, a glass film 3 that is formed on a surface (steel sheet surface 2a) of the steel sheet 2, and an insulating film 4 that is formed on a surface of the glass film 3.

As illustrated in FIG. 1, a plurality of grooves 5, which extends in a direction that intersects the rolling direction X and in which a groove depth direction matches the sheet thickness direction Z, are formed on the steel sheet surface 2a along the rolling direction X at a predetermined interval for magnetic domain refinement. That is, FIG. 2 is a view when one of the grooves 5 is seen on a cross-section including the groove extension direction and the sheet thickness direction Z. FIG. 3 is a view when the one groove 5 is seen on a cross-section that perpendicular to the groove extension direction. Furthermore, the grooves 5 may be provided to intersect the rolling direction X, and it is not necessary for the groove extension direction and the rolling direction X to be perpendicular to each other. However, in this embodiment, a case where the groove extension direction and the rolling direction X are perpendicular to each other will be exemplified for convenience of explanation. In addition, in a case where each of the grooves 5 is seen from the sheet thickness direction Z (in a case of a plan view of the groove 5), the groove 5 may have an arch shape. However, in this embodiment, the groove 5 having a linear shape is exemplified for convenience of explanation.

The steel sheet 2 contains, as chemical components in terms of mass fraction, Si: 0.8% to 7%, C: greater than 0% and equal to or less than 0.085%, acid-soluble Al: 0% to 0.065%, N: 0% to 0.012%, Mn: 0% to 1%, Cr: 0% to 0.3%, Cu: 0% to 0.4%, P: 0% to 0.5%, Sn: 0% to 0.3%, Sb: 0% to 0.3%, Ni: 0% to 1%, S: 0% to 0.015%, Se: 0% to 0.015%, and the remainder including Fe and unavoidable impurities.

The chemical components of the steel sheet 2 are chemical components which are preferable for a control to a Goss texture in which a crystal orientation is integrated to a {110}<001> orientation. Among the elements, Si and C are basic elements, and acid-soluble Al, N, Mn, Cr, Cu, P, Sn, Sb, Ni, S, and Se are selective elements. The selective elements may be contained in correspondence with the purpose thereof. Accordingly, it is not necessary to limit the lower limit, and the lower limit may be 0%. In addition, the effect of this embodiment does not deteriorate even when the selective elements are contained as impurities. In the steel sheet 2, the remainder of the basic elements and the selective elements may be composed of Fe and impurities. In addition, the impurities represent elements which are unavoidably mixed in due to ore and scrap as a raw material, or a manufacturing environment and the like when industrially manufacturing the steel sheet 2.

In addition, an electrical steel sheet is typically subjected to purification annealing during secondary recrystallization. Discharge of an inhibitor forming element to the outside of a system occurs in the purification annealing. Particularly, a decrease in a concentration significantly occurs with respect to N and S, and the concentration becomes 50 ppm or less. Under typical purification annealing conditions, the concentration becomes 9 ppm or less, or 6 ppm or less. If the purification annealing is sufficiently performed, the concentration reaches to a certain extent (1 ppm or less) at which detection is impossible in typical analysis.

The chemical component of the steel sheet 2 may be measured in accordance with a typical steel analysis method. For example, the chemical components of the steel sheet 2 may be measured by using inductively coupled plasma-atomic emission spectrometry (ICP-AES). Specifically, it is possible to specify the chemical components by performing measurement for a test piece of 35 mm square, which is obtained from the central position of the steel sheet 2 after film removal, by using ICPS-8100 (a measurement device, manufactured by Shimadzu Corporation) and the like under conditions based on a calibration curve that is created in advance. Furthermore, C and S may be measured by using a combustion-infrared ray absorption method, and N may be measured by using inert gas fusion-thermal conductivity method.

For example, the glass film 3 is constituted by a composite oxide such as forsterite ($Mg_2SiO_4$), spinel ($MgAl_2O_4$), and cordierite ($Mg_2Al_4Si_5O_{16}$). Although details will be described later, the glass film 3 is a film that is formed to prevent adhering to the steel sheet 2 in a final annealing process that is one of manufacturing processes of the grain-oriented electrical steel sheet 1. Accordingly, the glass film 3 is not an essential element among constituent elements of the grain-oriented electrical steel sheet 1.

For example, the insulating film 4 contains colloidal silica and phosphate, and plays a role of applying electrical insulating properties, a tensile force, corrosion resistance, heat resistance, and the like to the steel sheet 2.

Furthermore, for example, the glass film 3 and the insulating film 4 of the grain-oriented electrical steel sheet 1 can be removed by the following method. The grain-oriented electrical steel sheet 1 including glass film 3 or the insulating film 4 is immersed in an aqueous sodium hydroxide solution containing 10 mass % of NaOH and 90 mass % of $H_2O$ at 80° C. for 15 minutes. Then, the grain-oriented electrical steel sheet 1 is immersed in an aqueous sulfuric acid solution containing 10 mass % of $H_2SO_4$ and 90 mass % of $H_2O$ at 80° C. for 3 minutes. Then, the grain-oriented electrical steel sheet 1 is immersed in an aqueous nitric acid solution containing 10 mass % of $HNO_3$ and 90 mass % of $H_2O$ at room temperature for a time period that is slightly shorter than 1 minute, and is washed. Finally, the grain-oriented electrical steel sheet 1 is dried by using a warm wind blower for a time period that is slightly shorter than 1 minute. Furthermore, in a case where the glass film 3 or the insulating film 4 is removed from the grain-oriented electrical steel sheet 1 according the above-described method, it is confirmed that a shape or roughness of the groove 5 of the steel sheet 2 is approximately the same as a shape or roughness before forming the glass film 3 or the insulating film 4.

The grain-oriented electrical steel sheet 1 according to this embodiment includes the following Configurations A, B, C, and D as characteristic configurations for improving rust resistance.

(A) Values of surface roughness parameters (Ra, RSm) which represent surface roughness of the groove bottom region of the groove 5 are within predetermined ranges.

(B) It is preferable that the insulating film 4 includes iron-containing particles.

(C) It is preferable that a Mg-concentrated region exists in the glass film 3 and the insulating film 4 at a position adjacent to the groove 5 along the groove extension direction.

(D) In the steel sheet 2, it is preferable that a grain size of a crystal grain that is in contact with the groove 5 is 5 μm or greater.

Hereinafter, Configurations A, B, C, and D will be described in detail.

(With Respect to Configuration A)

In this embodiment, as illustrated in FIG. 2, in a case where the groove 5 is seen on a cross-section (longitudinal groove cross-section) including the groove extension direction (in this embodiment, a direction parallel to the sheet width direction Y) and the sheet thickness direction Z, an arithmetic average height Ra of a roughness curve, which constitutes a contour of a groove bottom region 5a of the groove 5, is 1 μm to 3 μm, preferably 1.2 μm to 2.5 μm, and more preferably 1.3 μm to 2.3 μm, and an average length RSm of a roughness curve element, which constitutes the contour of the groove bottom region 5a, is 10 μm to 150 μm, preferably 40 μm to 145 μm, and more preferably 60 μm to 140 μm.

When the surface roughness parameters (Ra, RSm) satisfy the above-described ranges, the groove bottom region 5a becomes a rough surface to a constant extent. Accordingly, adhesiveness between the steel sheet 2 and the glass film 3 or the insulating film 4 is improved due to an anchor effect. According to this, cracking or peeling-off is less likely to occur in the glass film 3 or the insulating film 4 at the periphery of the groove 5. As a result, the rust resistance of the grain-oriented electrical steel sheet 1, in which the groove 5 is formed in a surface of the steel sheet 2 for magnetic domain refinement, is improved.

However, as illustrated in FIG. 3, the depth of the groove 5 is not always constant in the width direction of the groove 5. Accordingly, it is necessary to clarify the groove bottom region 5a when the groove 5 is seen on the longitudinal groove cross-section. Hereinafter, description will be given of an example of a method of specifying the groove bottom region 5a in a case where the groove 5 is seen on the longitudinal groove cross-section.

Figure 4:
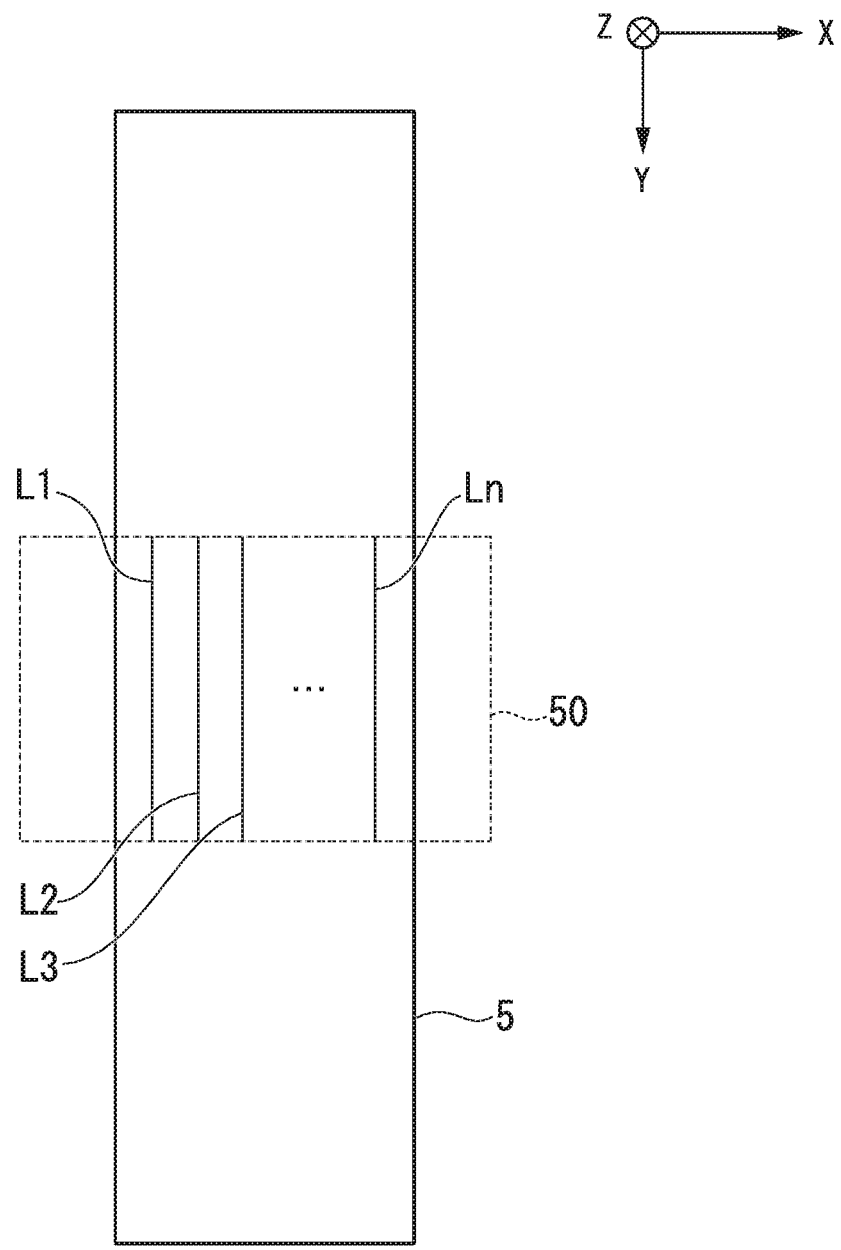
FIG. 4 is a first explanatory view related to definition of a groove reference line BL of the groove 5.
Figure 5A:
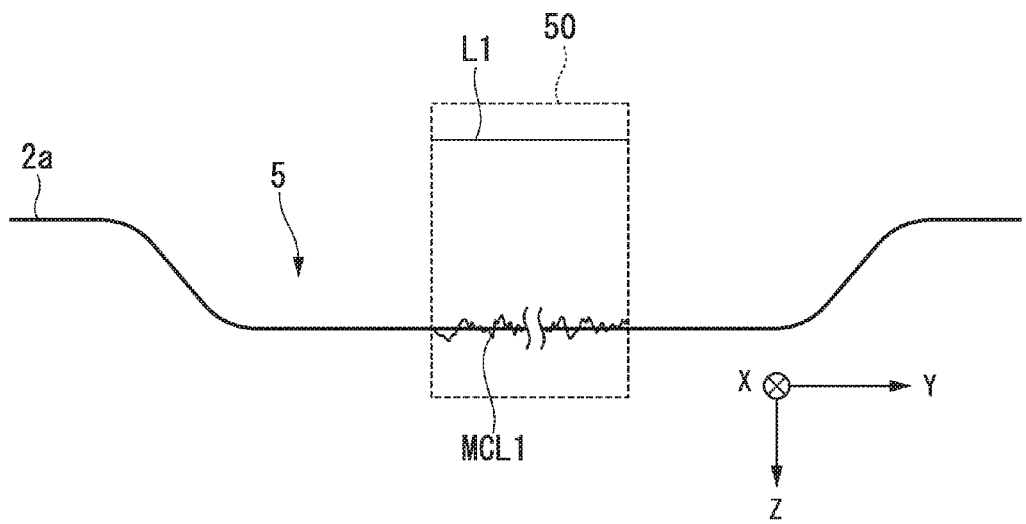
FIG. 5A is a second explanatory view related to definition of the groove reference line BL of the groove 5.

As illustrated in FIG. 4, in a case where the groove 5 is seen from the sheet thickness direction Z (in a plan view of the groove 5), an observation range 50 is set to a part of the groove 5, and a plurality of (n) virtual lines L1 to Ln are virtually set in the observation range 50 along the groove extension direction. It is preferable that the observation range 50 is set to a region excluding an end in the extension direction of the groove 5 (that is, a region in which a shape of the groove bottom is stable). For example, the observation range 50 may be an observation region in which a length in the groove extension direction is approximately 300 μm. Next, when measuring surface roughness of the groove 5 along the virtual line L1 by using a laser type surface roughness measuring device and the like, as illustrated in FIG. 5A, a measurement cross-section curve MCL1, which constitutes a contour of the groove 5 in the groove extension direction, is obtained in a shape conforming to the virtual line L1.

Figure 5B:
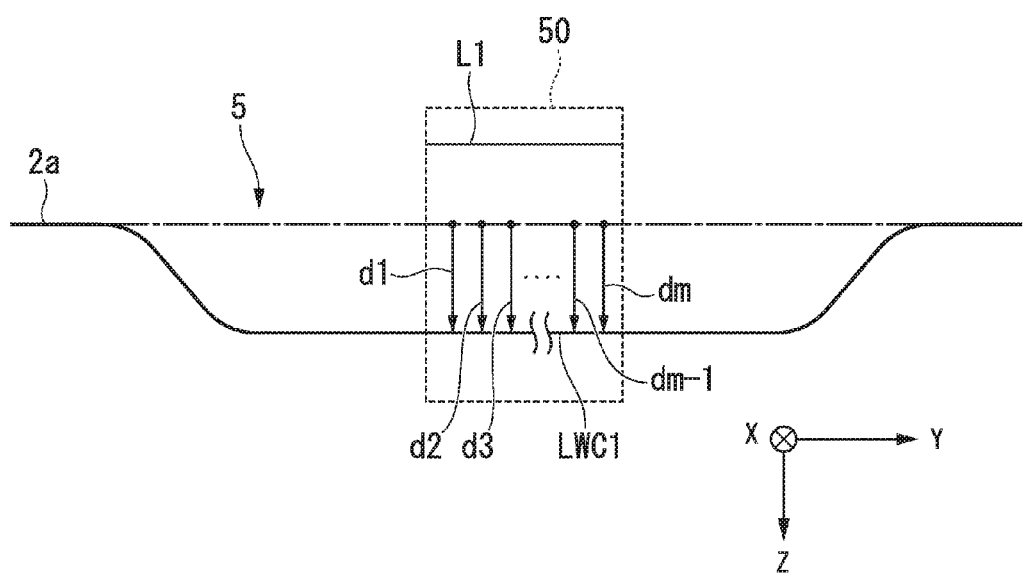
FIG. 5B is a third explanatory view related to definition of the groove reference line BL of the groove 5.

After obtaining a cross-section curve by applying a low-pass filter (cut-off value: λs) to the measurement cross-section curve MCL1 obtained with respect to the virtual line L1 as described above, when a band filter (cut-off value: λf, λc) is applied to the cross-section curve to remove long wavelength components and short wavelength components from the cross-section curve, as illustrated in FIG. 5B, a waving curve LWC1, which constitutes a contour of the groove 5 in the groove extension direction, is obtained in a shape conforming to the virtual line L1. The waving curve is one kind of contour curves in combination with the following roughness curve. The roughness curve is a contour curve that is suitable to express, particularly, surface roughness of the contour with accuracy, and the waving curve is a contour curve that is suitable to simplify the shape of the contour with a smooth line.

As illustrated in FIG. 5B, when using the waving curve LWC1, distances (depths d1 to dm: unit is μm) in the sheet thickness direction Z between the steel sheet surface 2a and the contour (that is, the waving curve LWC1) of the groove 5 are obtained at a plurality of (m) positions along the virtual line L1. In addition, an average value (average groove depth D1) of the depths d1 to dm is obtained. Average groove depths D2 to Dn are also obtained with respect to other virtual lines L2 to Ln according to the same measurement method.

Furthermore, it is necessary to measure a position (height) of the steel sheet surface 2a in the Z direction in advance so as to measure the distance between the steel sheet surface 2a and the contour (waving curve LWC1) of the groove 5. For example, the position (height) in the Z direction may be measured with respect to a plurality of sites on the steel sheet surface 2a in the observation range 50 by using the laser type surface roughness measuring device, and an average value of the measurement results may be used as the height of the steel sheet surface 2a.

Figure 6:
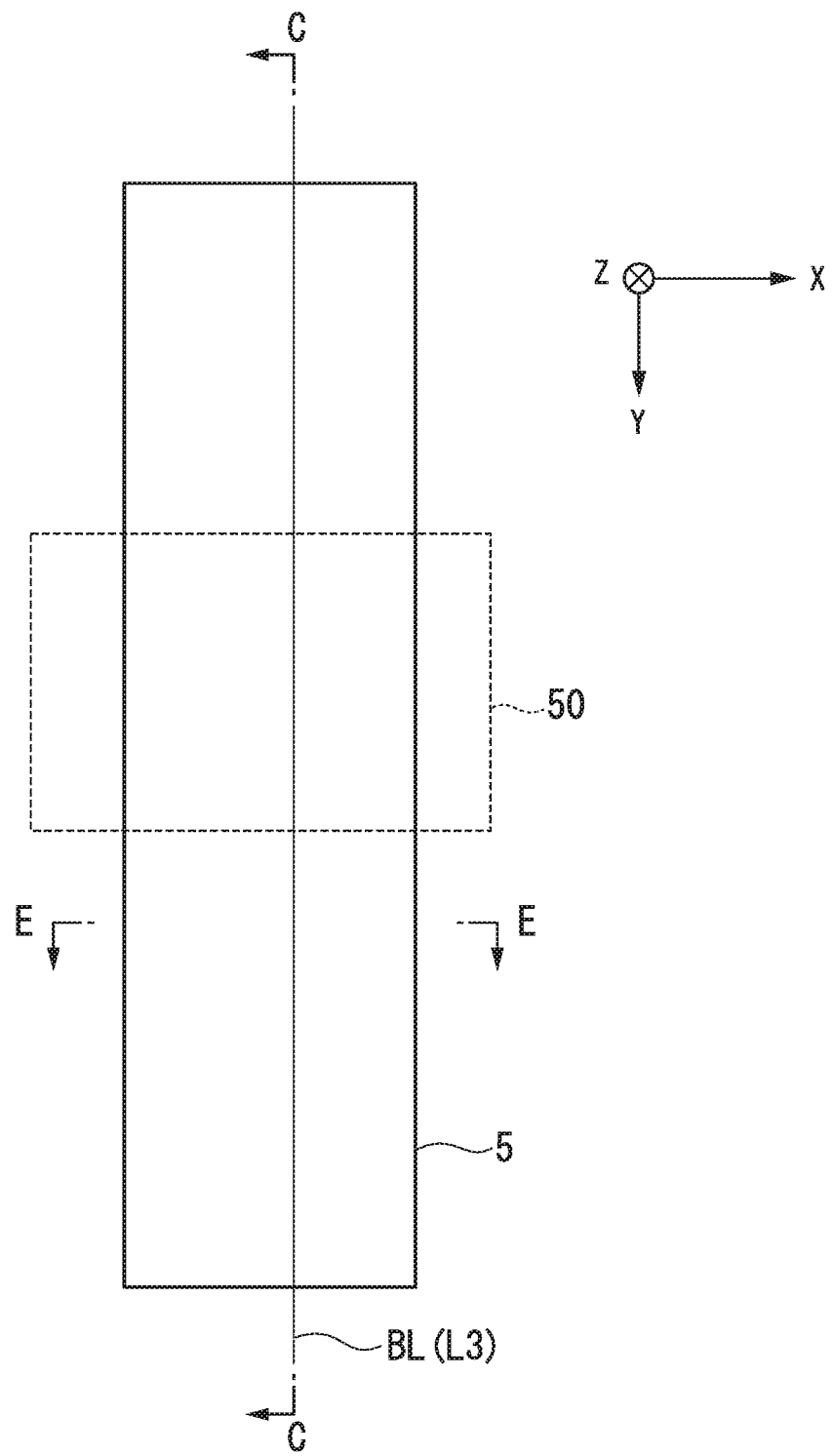
FIG. 6 is a fourth explanatory view related to definition of the groove reference line BL of the groove 5.

In this embodiment, among the virtual lines L1 to Ln, a virtual line, which conforms to the groove extension direction and satisfies a condition in which an average groove depth becomes the maximum, is selected as a groove reference line BL, and an average groove depth of the groove reference line BL is defined as an average depth D (unit: μm) of the groove 5. For example, as illustrated in FIG. 6, among the average groove depths D1 to Dn which are obtained with respect to the virtual lines L1 to Ln, in a case where the average groove depth D3 is the maximum, the virtual line L3 is defined as the groove reference line BL, and the average groove depth D3 of the virtual line L3 is defined as the groove depth D of the groove 5. It is preferable that the groove depth D of the groove 5 in this embodiment is 5 μm to 40 μm so as to preferably obtain an effect of the magnetic domain refinement.

Furthermore, it is preferable that the groove width W of the groove 5 in this embodiment is 10 μm to 250 μm so as to preferably obtain the effect of the magnetic domain refinement. The groove width W may be obtained as a length of a line segment (groove opening) that connects two points, at which a depth from the steel sheet surface 2a to a surface of the groove 5 in the sheet thickness direction Z becomes 0.05×D with respect to the groove depth D of the groove 5, on a waving curve of the groove 5 on the transverse groove cross-section perpendicular to the groove extension direction (refer to FIG. 9).

Figure 7:
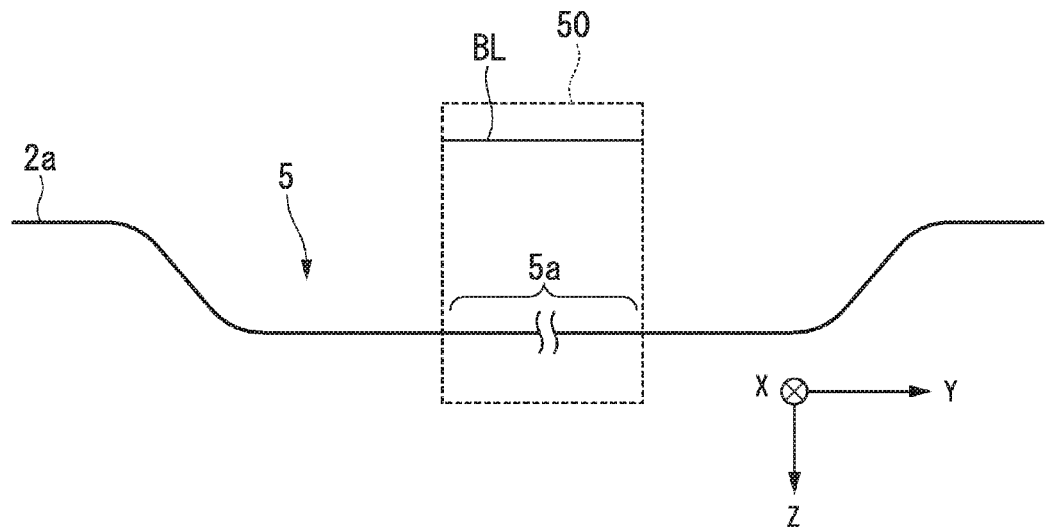
FIG. 7 is an arrow cross-sectional view taken along line C-C in FIG. 6, and an explanatory view related to definition of a groove bottom region 5a of the groove 5.

FIG. 7 is an arrow cross-sectional view taken along line C-C in FIG. 6. That is, FIG. 7 is a view when the groove 5 is seen on the longitudinal groove cross-section including the groove reference line BL and the sheet thickness direction Z. In this embodiment, as illustrated in FIG. 7, in a case where the groove 5 is seen on the longitudinal groove cross-section including the groove reference line BL and the sheet thickness direction Z, a contour of the groove 5, which is shown in an observation range 50, is defined as the groove bottom region 5a.

Figure 8:
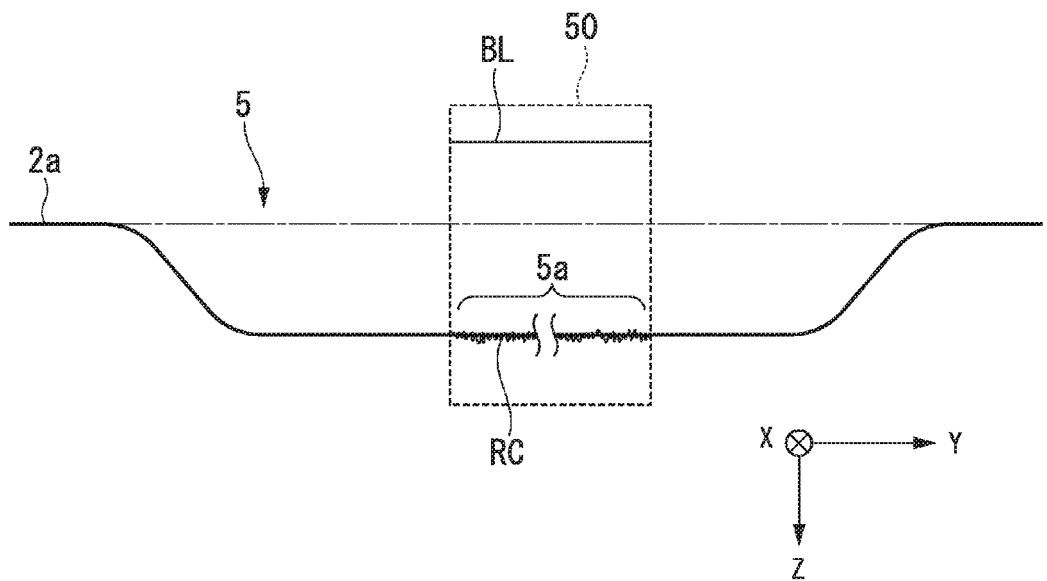

The groove bottom region 5a of the groove 5 is specified in accordance with the above-described method. That is, in this embodiment, as illustrated in FIG. 8, the arithmetic average height Ra of the roughness curve RC, which is obtained through conversion of a measurement cross-section curve that constitutes the contour of the groove bottom region 5a of the groove 5 on the longitudinal groove cross-section including the groove reference line BL and the sheet thickness direction Z, is 1 μm to 3 μm, preferably 1.2 μm to 2.5 μm, and more preferably 1.3 μm to 2.3 μm, and the average length RSm of the roughness curve element, which is obtained through conversion of the measurement cross-section curve that constitutes the contour of the groove bottom region 5a, is 10 μm to 150 μm, preferably 40 μm to 145 μm, and more preferably 60 μm to 140 μm. The roughness curve RC is obtained as follows. After obtaining a cross-section curve by applying a low-pass filter with a cut-off value $\lambda s$ to the measurement cross-section curve obtained with respect to the groove reference line BL, a high-pass filter (cut-off value: $\lambda c$) is applied to the cross-section curve to exclude a long wavelength component from the cross-section curve. According to this, the roughness curve RC is obtained. Definition of the arithmetic average height Ra of the roughness curve RC and the average length RSm of the roughness curve element is based on Japanese Industrial Standard JIS B0601 (2013).

(With Respect to Configuration B)

As illustrated in FIG. 3, in this embodiment, in a case where the groove 5 is seen on the transverse groove cross-section that is perpendicular to the groove extension direction, a region, which extends from a base point that is a boundary G between the groove 5 and the steel sheet surface 2a by 10 μm to 500 μm in a direction that is perpendicular to the sheet thickness direction Z and points away from the groove 5 on the transverse groove cross-section, is defined as a particle existing region W1.

As illustrated in FIG. 3, in this embodiment, the insulating film 4 in the particle existing region W1 includes iron-containing particles 6 having an equivalent circle diameter of 0.1 μm to 2 μm. A ratio of an area of the iron-containing particles 6 to an area of the particle existing region W1 is equal to or greater than 0.1% and less than 30%. Here, the area of the iron-containing particles 6 represents a total value (total area) of the area (surface area of particles) of a plurality of the iron-containing particles 6 which exist in the particle existing region W1 of the insulating film 4. In a case where the ratio of the area of the iron-containing particles 6 to the area of the particle existing region W1 is 0.1% or greater, the strength of the insulating film 4 increases, and cracking of the insulating film 4 decreases. As a result, the rust resistance of the grain-oriented electrical steel sheet 1 is improved. According to this, it is preferable that the ratio of the area of the iron-containing particles 6 to the area of the particle existing region W1 is 0.1% or greater. On the other hand, in a case where the ratio of the area of the iron-containing particles 6 to the area of the particle existing region W1 is greater than 30%, conductivity of iron increases, and interlayer resistance decreases. Accordingly, a short-circuit current flows, and an eddy current loss of the grain-oriented electrical steel sheet 1 increases. According to this, it is preferable that the ratio of the area of the iron-containing particles 6 to the area of the particle existing region W1 is less than 30%. The iron-containing particles 6 contain 80% to 100% of iron in terms of a mass fraction. The iron-containing particles 6 may further contain, in terms of a mass fraction, 0% to 10% of Si and 0% to 10% of Mg.

When the width of the particle existing region W1 satisfies the above-described range, and the equivalent circle diameter and the area of the iron-containing particles 6 satisfy the above-described ranges, the strength of the insulating film 4 in the particle existing region W1 is improved. Accordingly, cracking or peeling-off is less likely to occur in the insulating film 4 at the periphery of the groove 5. As a result, the rust resistance of the grain-oriented electrical steel sheet 1, in which the groove 5 is formed in the surface of the steel sheet 2 for magnetic domain refinement, is further improved.

However, in a case where the transverse groove cross-section of the groove 5 is observed with an electron microscope and the like, the boundary G between the groove 5 and the steel sheet surface 2a may be unclear. Accordingly, it is necessary to clarify the boundary G between the groove 5 and the steel sheet surface 2a. Hereinafter, description will be given of an example of a method of specifying the boundary G between the groove 5 and the steel sheet surface 2a in a case where the groove 5 is seen on the transverse groove cross-section.

Figure 9:
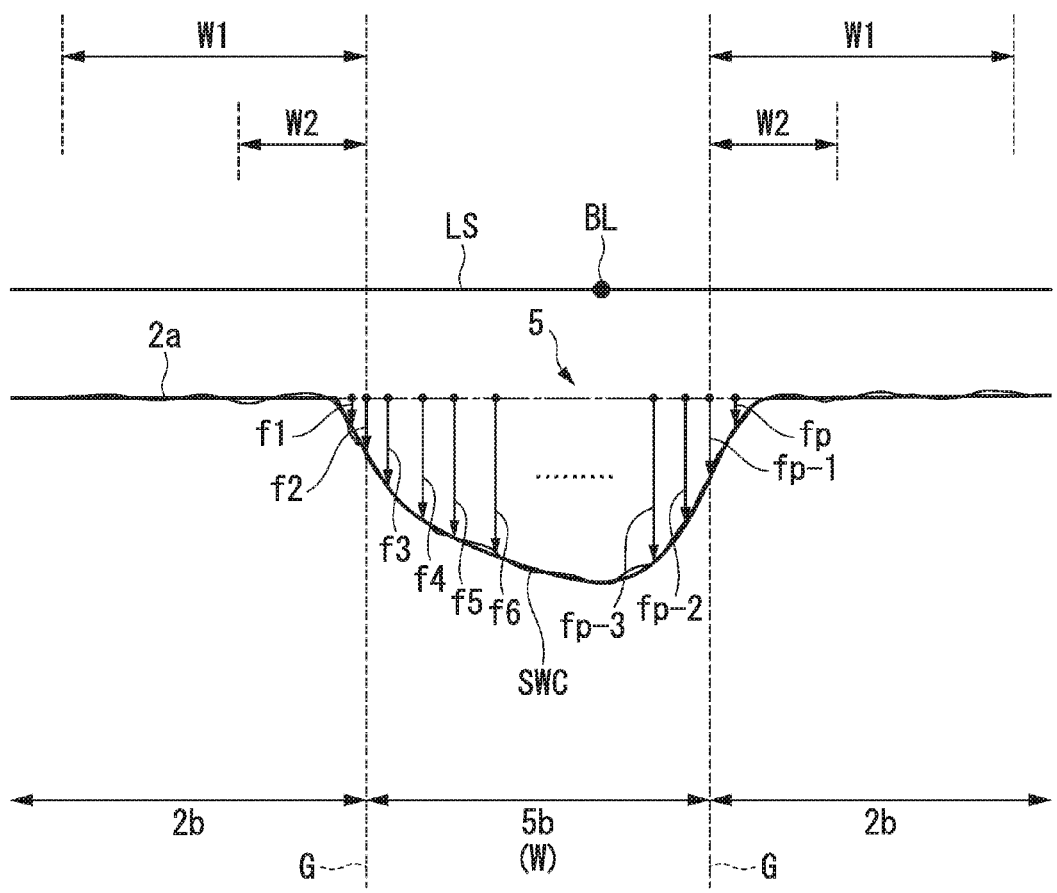
FIG. 9 is an arrow cross-sectional view taken along line E-E in FIG. 6, and is an explanatory view related to definition of a groove region 5b, a steel sheet region 2b, a particle existing region W1, and a Mg-concentrated region W2.

FIG. 9 is an arrow cross-sectional view taken along line E-E in FIG. 6. That is, FIG. 9 is a view when the groove 5 is seen on the transverse groove cross-section that is perpendicular to the groove extension direction. As illustrated in FIG. 9, in a case where the groove 5 is seen on the transverse groove cross-section, a curve, which is obtained by converting a measurement cross-section curve that is shown on the transverse groove cross-section and constitutes a contour of the groove 5 into a waving curve, is defined as a transverse groove waving curve SWC. As illustrated in FIG. 9, when a virtual line Ls, which is perpendicular to the groove reference line BL in an XY plane, is virtually set, and surface roughness of the steel sheet 2 including the groove 5 is measured along the virtual line Ls by using a laser type surface roughness measuring device and the like, a measurement cross-section curve, which constitutes the contour of the groove 5 on the transverse groove cross-section, is obtained in a shape conforming to the virtual line Ls.

A transverse groove waving curve SWC, which is shown on the transverse groove cross-section, is obtained as follows. After obtaining a cross-section curve by applying a low-pass filter (cut-off value: λs) to the measurement cross-section curve obtained with respect to the virtual line Ls, a band filter (cut-off value: λf, λc) is applied to the cross-section curve to exclude a long wavelength component and a short wavelength component from the cross-section curve. According to this, the transverse groove waving curve SWC is obtained.

As illustrated in FIG. 9, when using the transverse groove waving curve SWC that is shown on the transverse groove cross-section and constitutes the contour of the groove 5, at a plurality (p) of positions along the virtual line Ls, distances (depths f1 to fp in a unit of μm) between the steel sheet surface 2a and the contour (that is, the transverse groove waving curve SWC) of the groove 5 in the sheet thickness direction Z are obtained. In this embodiment, as illustrated in FIG. 9, a region satisfying the following Conditional Expression (2) in the transverse groove waving curve SWC is defined as a groove region 5b, and a region other than the groove region 5b is defined as a steel sheet region 2b. A boundary between the groove region 5b and the steel sheet region 2b is specified as the boundary G between the groove 5 and the steel sheet surface 2a. Furthermore, a width of the groove region 5b corresponds to the groove width W.

$$fi \geq 0.05 \times D \quad (2)$$

(provided that, i is an integer of 1 to p)

(With Respect to Configuration C)

In this embodiment, a region in the glass film 3 and the insulating film 4, in which the Mg content is an average of 1.3 or more times an average Mg content in the glass film 3 and the insulating film 4 in terms of a mass fraction, is defined as a Mg-concentrated region W2. As illustrated in FIG. 3, in this embodiment, in a case where the groove 5 is seen on the transverse groove cross-section that is perpendicular to the groove extension direction, the Mg-concentrated region W2 is included in a region spaced away from a base point that is a boundary G between the groove 5 and the steel sheet surface 2a by 0.1 μm to 10 μm in a direction that is perpendicular to the sheet thickness direction Z and points away from the groove 5 on the transverse groove cross-section.

That is, the average Mg content in terms of a mass fraction in the glass film 3 and the insulating film 4 in the Mg-concentrated region W2 illustrated in FIG. 3 is 1.3 or more times the average Mg content in the glass film 3 and the insulating film 4 in terms of a mass fraction. Furthermore, as described above, the boundary between the groove region 5b and the steel sheet region 2b is specified as the boundary G between the groove 5 and the steel sheet surface 2a (refer to FIG. 9).

Figure 10:
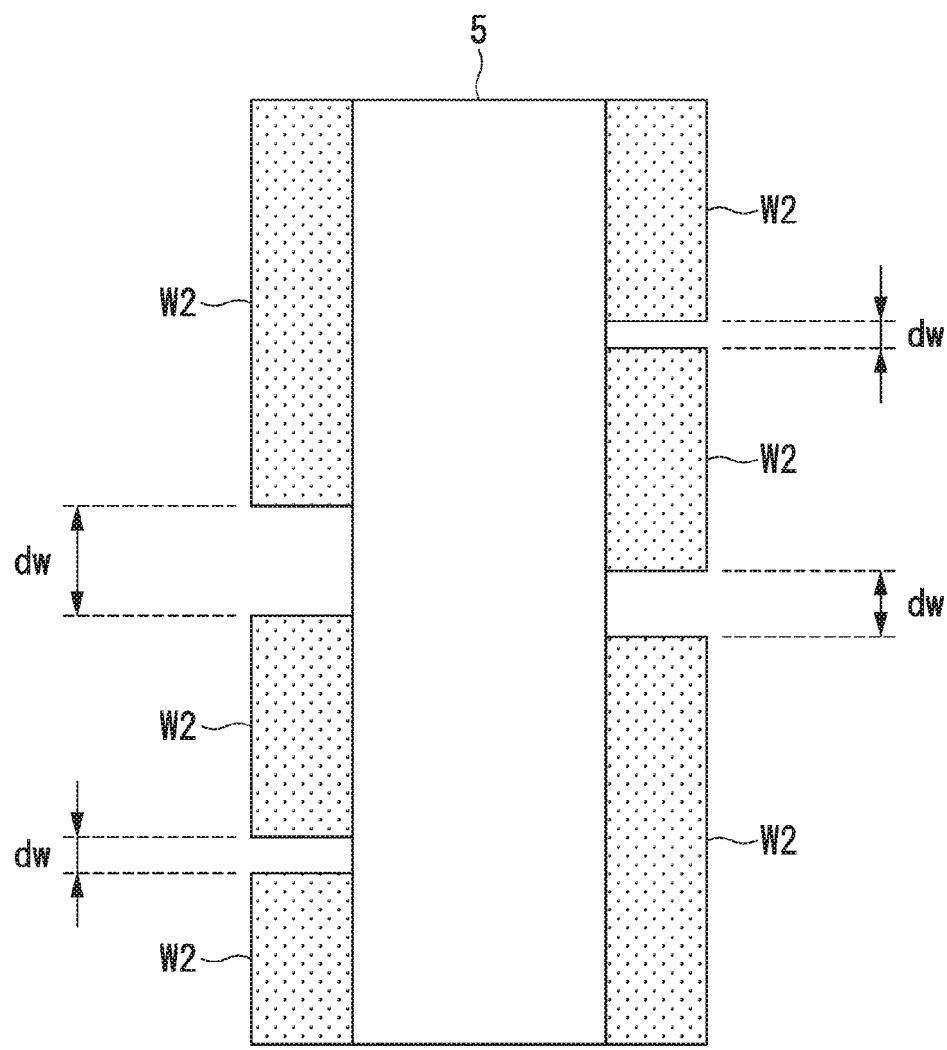
FIG. 10 is a schematic view illustrating the Mg-concentrated region W2 when the groove 5 is seen from a sheet thickness direction Z.

In addition, as illustrated in FIG. 10, in a case where the groove 5 is seen from the sheet thickness direction Z (in a case of a plan view of the groove 5), a plurality of the Mg-concentrated regions W2 exist along the groove extension direction. In this case, a distance dw between the Mg-concentrated regions W2 adjacent to each other along the groove extension direction is greater than 0 and equal to or less than 100 μm. Alternatively, the Mg-concentrated region W2 may continuously exist along the groove extension direction. Furthermore, the Mg content can be measured by using an electron probe microanalyser (EPMA) and the like.

When the width of the Mg-concentrated region W2 is included in the above-described range, and the distance dw between the Mg-concentrated regions W2 adjacent to each other is included in the above-described range, the insulating film 4 and the surface of the steel sheet 2 are strongly bonded to each other. Accordingly, cracking or peeling-off is less likely to occur in the insulating film 4 at the periphery of the groove 5. As a result, the rust resistance of the grain-oriented electrical steel sheet 1, in which the groove 5 is formed in the surface of the steel sheet 2 for magnetic domain refinement, is further improved.

(With Respect to Configuration D)

In this embodiment, in the steel sheet 2, it is preferable that an average grain size of a crystal grain that is in contact with the groove 5 is 5 μm or greater. In a case where a melted and solidified region, which is derived from formation of the groove 5, exists at the periphery of the groove 5, the grain size of the crystal grain that is in contact with the groove 5 becomes fine. In this case, there is a high possibility that the crystal orientation finally deviates from the {110} <001> orientation. Therefore, there is a high possibility that preferable magnetic characteristics are not obtained. Accordingly, it is preferable that the melted and solidified region does not exist at the periphery of the groove 5. In a case where the melted and solidified region does not exist at the periphery of the groove 5, the average grain size of the crystal grain (secondary recrystallized grain) that is in contact with the groove 5 becomes 5 μm or greater. In addition, the upper limit of the grain size of the crystal grain that is in contact with the groove 5 is not particularly limited, but the upper limit may be set to $100 \times 10^3$ μm or less. Furthermore, the grain size of the crystal grain represents an equivalent circle diameter. For example, the grain size of the crystal grain may be obtained by a typical crystal grain measuring method such as ASTM E112, or may be obtained by an electron back scattering diffraction pattern (EBSD) method. In addition, the crystal grain that is in contact with the groove 5 may be observed on the transverse groove cross-section or a cross-section that is perpendicular to the sheet thickness direction Z.

For example, the groove 5, which does not include the melted and solidified region, can be obtained by the following manufacturing method.

As described above, according to this embodiment, it is possible to greatly improve the rust resistance of the grain-oriented electrical steel sheet 1 in which the groove 5 is formed in the steel sheet surface 2a for magnetic domain refinement.

In addition, as illustrated in FIG. 3, the embodiment exemplifies a state in which the glass film 3 does not exist in the groove 5 (groove region 5b) (that is, a state in which the average thickness of the glass film 3 is 0 μm), but the glass film 3 of which the average thickness is greater than 0 μm and equal to or less than 5 μm, and the insulating film 4 of which the average thickness is 1 μm to 5 μm may be disposed in the groove 5. In addition, the glass film 3 of which the average thickness is 0.5 μm to 5 μm, and the insulating film 4 of which the average thickness is 1 μm to 5 μm may be disposed on the steel sheet surface 2a (steel sheet region 2b). In addition, the average thickness of the glass film 3 in the groove 5 may be smaller than the average thickness of the glass film 3 on the steel sheet surface 2a.

When the thickness of the glass film 3 and the insulating film 4 is set as described above, cracking or peeling-off is less likely to occur in the insulating film 4 at the periphery of the groove 5. Accordingly, the rust resistance of the grain-oriented electrical steel sheet 1 is further improved. In addition, when employing a configuration in which the glass film 3 does not exist in the groove 5 (that is, a configuration in which the average thickness of the glass film 3 in the groove 5 is 0 μm), it is possible to further reduce a distance (groove width) between groove wall surfaces which face each other. Accordingly, it is possible to further improve the magnetic domain refinement effect (that is, an anomalous eddy current reducing effect) due to due to the groove 5.

In addition, the embodiment exemplifies the grain-oriented electrical steel sheet 1 including the glass film 3. However, since the glass film 3 is not essential constituent element as described above, even when the invention is applied to a grain-oriented electrical steel sheet constituted by only the steel sheet 2 and the insulating film 4, the rust resistance improving effect can be obtained. In the grain-oriented electrical steel sheet that is constituted by only the steel sheet 2 and the insulating film 4, the insulating film 4 of which the average thickness is 1 μm to 5 μm may be disposed in the groove 5 (groove region 5b), and the insulating film 4 of which the average thickness is 1 μm to 5 μm may be disposed on the steel sheet surface 2a (steel sheet region 2b).

Next, description will be given of a method of manufacturing the grain-oriented electrical steel sheet 1 according to this embodiment.

Figure 11:
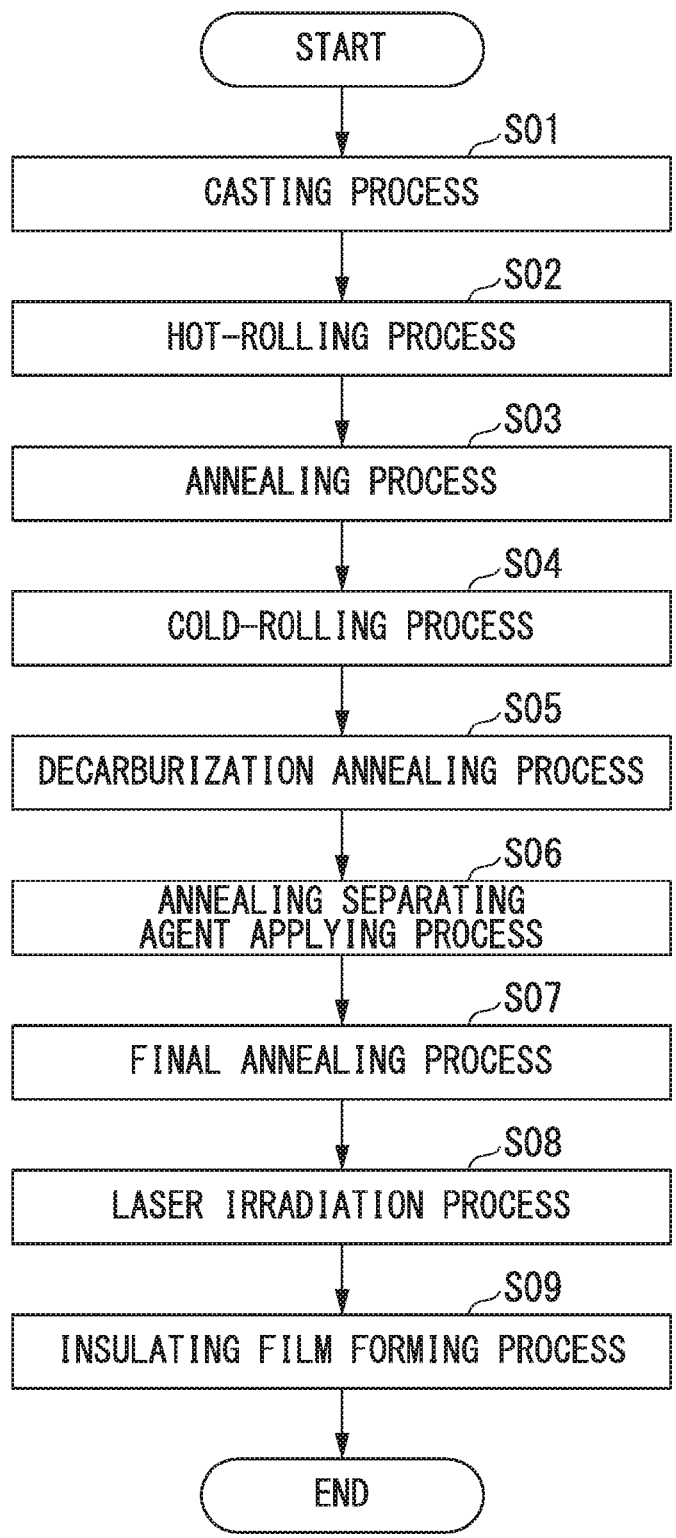
FIG. 11 is a flowchart illustrating manufacturing processes of the grain-oriented electrical steel sheet 1.

FIG. 11 is a flowchart illustrating manufacturing processes of the grain-oriented electrical steel sheet 1. As illustrated in FIG. 11, in a first casting process S01, molten steel, which has a chemical composition including, in terms of mass fraction, Si: 0.8% to 7%, C: greater than 0% and equal to or less than 0.085%, acid-soluble Al: 0% to 0.065%, N: 0% to 0.012%, Mn: 0% to 1%, Cr: 0% to 0.3%, Cu: 0% to 0.4%, P: 0% to 0.5%, Sn: 0% to 0.3%, Sb: 0% to 0.3%, Ni: 0% to 1%, S: 0% to 0.015%, Se: 0% to 0.015%, and the remainder including Fe and unavoidable impurities, is supplied to a continuous casting machine, and a slab is continuously produced.

Subsequently, in a hot-rolling process S02 the slab obtained in the casting process S01 is heated to a predetermined temperature (for example, 1150° C. to 1400° C.), and hot-rolling is performed with respect to the slab. According to this, for example, a hot-rolled steel sheet having the thickness of 1.8 to 3.5 mm is obtained.

Subsequently, in an annealing process S03, an annealing treatment is performed with respect to the hot-rolled steel sheet obtained in the hot-rolling process S02 under a predetermined temperature condition (for example, a condition in which heating is performed at 750° C. to 1200° C. for 30 seconds to 10 minutes). Subsequently, in a cold-rolling process S04, pickling is performed with respect to a surface of the hot-rolled steel sheet that is subject to the annealing treatment in the annealing process S03, and then cold-rolling is performed with respect to the hot-rolled steel sheet. According to this, for example, a cold-rolled steel sheet having the thickness of 0.15 to 0.35 mm is obtained.

Subsequently, in a decarburization annealing process S05, a heat treatment (that is, a decarburization annealing treatment) is performed with respect to the cold-rolled steel sheet obtained in the cold-rolling process S04 under a predetermined temperature condition (for example, a condition in which heating is performed at 700° C. to 900° C. for 1 to 3 minutes). When the decarburization annealing treatment is performed, in the cold-rolled steel sheet, carbon is reduced to a predetermined amount or less, and primary recrystallized structure is formed. In addition, in the decarburization annealing process S05, an oxide layer, which contains silica ($SiO_2$) as a main component, is formed on a surface of the cold-rolled steel sheet.

Subsequently, in an annealing separating agent applying process S06, an annealing separating agent, which contains magnesia (MgO) as a main component, is applied to the surface (the surface of the oxide layer) of the cold-rolled steel sheet. Subsequently, in final annealing process S07, a heat treatment (that is, a final annealing treatment) is performed with respect to the cold-rolled steel sheet onto which the annealing separating agent is applied under a predetermined temperature condition (for example, a condition in which heating is performed at 1100° C. to 1300° C. for 20 to 24 hours). When the final annealing treatment is performed, secondary recrystallization occurs in the cold-rolled steel sheet, and the cold-rolled steel sheet is purified. As a result, it is possible to obtain a cold-rolled steel sheet which has the above-described chemical composition of the steel sheet 2 and in which a crystal orientation is controlled so that a magnetization easy axis of a crystal grain and the rolling direction X match each other (that is, the steel sheet 2 in a state before the groove 5 is formed in the grain-oriented electrical steel sheet 1).

In addition, when the final annealing treatment is performed as described above, an oxide layer containing silica as a main component reacts with the annealing separating agent that contain magnesia as a main component, and the glass film 3 including a composite oxide such as forsterite ($Mg_2SiO_4$) is formed on a surface of the steel sheet 2. In the final annealing process S07, the final annealing treatment is performed in a state in which the steel sheet 2 is coiled in a coil shape. The glass film 3 is formed on the surface of the steel sheet 2 during the final annealing treatment. Accordingly, it is possible to prevent adhering to the steel sheet 2 that is coiled in a coil shape.

Subsequently, in a laser irradiation process S08, the surface (only one surface) of the steel sheet 2, on which the glass film 3 is formed, is irradiated with a laser to form a plurality of the grooves 5, which extend in a direction intersecting the rolling direction X, in the surface of the steel sheet 2 along the rolling direction X at a predetermined interval. Hereinafter, the laser irradiation process S08 will be described in detail with reference to FIG. 12 to FIG. 14.

Figure 12:
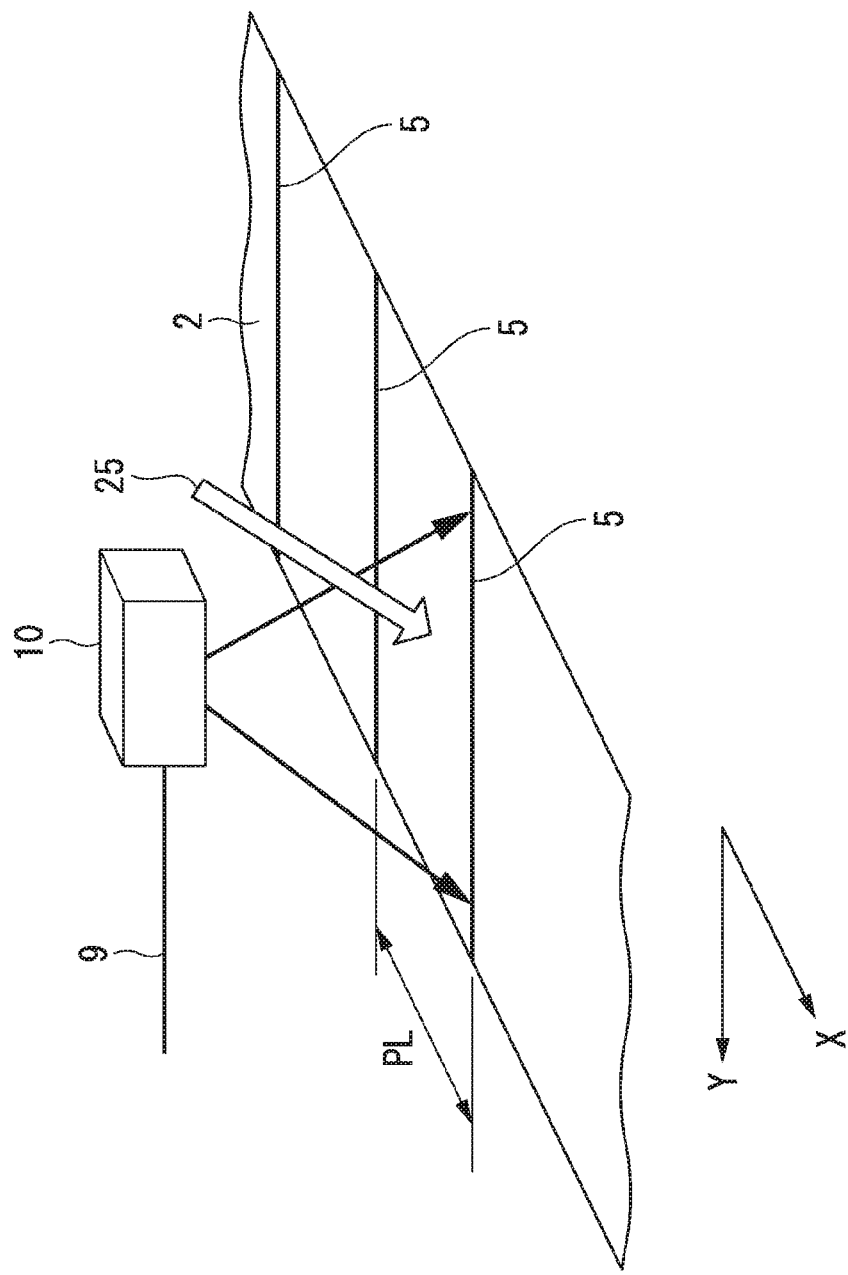
FIG. 12 is a first explanatory view related to a laser irradiation process S08 in the manufacturing processes of the grain-oriented electrical steel sheet 1.

As illustrated in FIG. 12, in the laser irradiation process S08, a laser YL, which is emitted from a laser light source (not illustrated), is transmitted to a laser irradiation device 10 through an optical fiber 9. A polygon mirror (not illustrated) and a rotary driving device (not illustrated) of the polygon mirror are embedded in the laser irradiation device 10. The laser irradiation device 10 irradiates the surface of the steel sheet 2 with the laser YL and scans the steel sheet 2 with the laser YL in a direction that is approximately parallel to the sheet width direction Y of the steel sheet 2 due to rotation of the polygon mirror.

An assist gas 25 such as air and an inert gas is sprayed to a portion of the steel sheet 2 which is irradiated with the laser YL in combination with the irradiation with the laser YL. Examples of the inert gas include nitrogen, argon, and the like. The assist gas 25 plays a role of removing a component that is melted or scattered from the steel sheet 2 with the laser irradiation. The laser YL reaches the steel sheet 2 without being blocked by the melted or scattered component due to the spraying of the assist gas 25. Accordingly, the groove 5 is stably formed. In addition, it is possible to suppress the component from being attached to the steel sheet 2 due to the spraying of the assist gas 25. As a result, the groove 5 is formed along a scanning line of the laser YL.

In the laser irradiation process S08, the surface of the steel sheet 2 is irradiated with the laser YL while the steel sheet 2 is conveyed along a sheet travelling direction that matches the rolling direction X. Here, a rotational speed of the polygon mirror is controlled in synchronization with a conveying speed of the steel sheet 2 so that the groove 5 is formed at a predetermined interval PL along the rolling direction X. As a result, as illustrated in FIG. 12, a plurality of the grooves 5, which intersect the rolling direction X, are formed in the surface of the steel sheet 2 at the predetermined interval PL along the rolling direction X.

As the laser light source, for example, a fiber laser can be used. A high output laser such as a YAG laser, a semiconductor laser, and a $CO_2$ laser, which are typically used for industry, may be used as the laser light source. In addition, a pulse laser or a continuous wave laser may be used as the laser light source as long as the groove 5 can be stably formed. As the laser YL, it is preferable to use a single mode laser that has a high light condensing property and is suitable for groove formation.

As irradiation conditions with the laser YL, for example, it is preferable that a laser output is set to 200 W to 2000 W, a light-condensing spot diameter of the laser YL in the rolling direction X (that is, a diameter including 86% of the laser output, hereinafter, referred to as 86% diameter) is set to 10 μm to 1000 μm, a light-condensing spot diameter (86% diameter) of the laser YL in the sheet width direction Y is set to 10 μm to 1000 μm, a laser scanning speed is set to 5 m/s to 100 m/s, and a laser scanning pitch (interval PL) is set to 2 mm to 10 mm. The laser irradiation conditions may be appropriately adjusted to obtain a desired groove depth D. For example, in a case of obtaining a deep groove depth D, the laser scanning speed may be set to be slow, and the laser output may be set to be high.

Figure 13A:
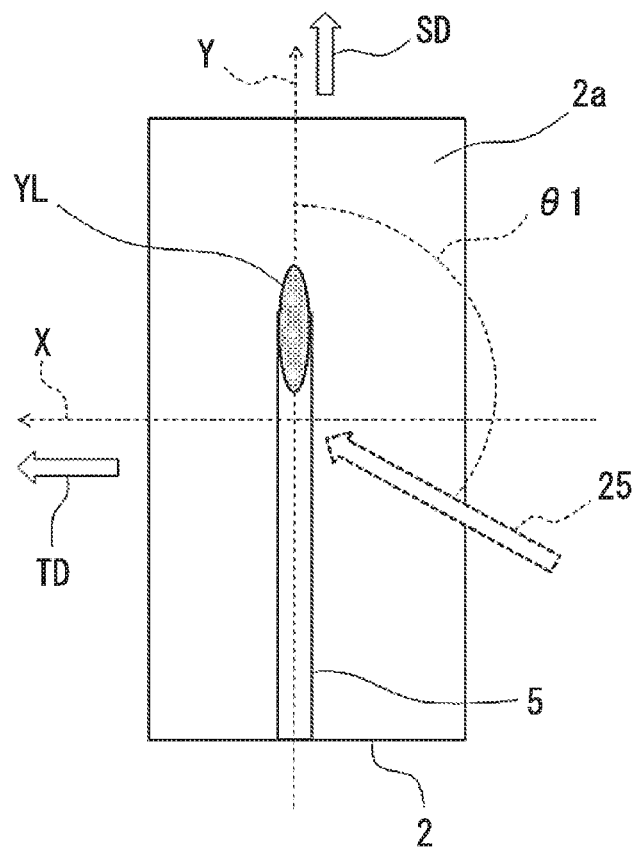
FIG. 13A is a second explanatory view related to the laser irradiation process S08 in the manufacturing processes of the grain-oriented electrical steel sheet 1.
Figure 13B:
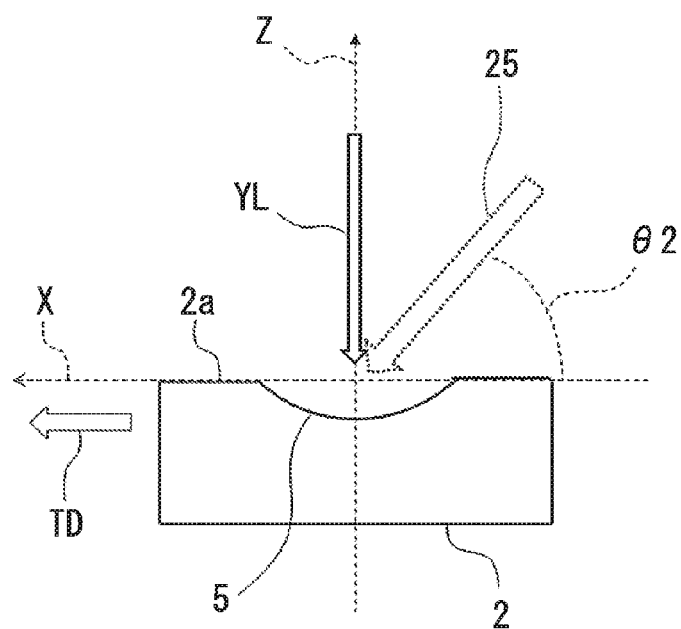
FIG. 13B is a third explanatory view related to the laser irradiation process S08 in the manufacturing processes of the grain-oriented electrical steel sheet 1.

As illustrated in FIG. 13A, in the laser irradiation process S08 of this embodiment, in a plan view of the steel sheet 2 that is conveyed along the sheet travelling direction TD that is parallel to the rolling direction X, the assist gas 25 is sprayed to conform to the laser YL from a direction having an inclination of a first angle θ1 with respect to the laser scanning direction SD (direction parallel to the sheet width direction Y) of the laser YL. In addition, as illustrated in FIG. 13B, when the steel sheet 2 that is conveyed along the sheet travelling direction TD is seen from the sheet width direction Y (laser scanning direction SD), the assist gas 25 is sprayed to conform the laser YL from a direction having an inclination of a second angle θ2 with respect to the steel sheet surface 2a. It is preferable that the first angle θ1 is set in a range of 90° to 180°, and the second angle θ2 is set in a range of 1° to 85°. In addition, it is preferable that a flow rate of the assist gas 25 is set in a range of 10 liters/minute to 1000 liters/minute.

In addition, it is preferable to perform an atmosphere control so that the amount of particles, which exist in a sheet travelling atmosphere of the steel sheet 2 and have a diameter of 0.5 μm or greater, becomes equal to or greater than 10 pieces and less than 10000 pieces per 1 CF (cubic feet).

Particularly, when the first angle θ1, which is the assist gas spraying angle with respect to the laser scanning direction, is set in the above-described range, it is possible to control the surface roughness (Ra, RSm) of the groove bottom region 5a with accuracy. In addition to this, when the amount of particles which exist in the sheet travelling atmosphere and have a diameter of 0.5 μm or greater, is set in the above-described range, it is possible to control the surface roughness (particularly, RSm) of the groove bottom region 5a with more accuracy. Particularly, when the flow rate of the assist gas 25 is set in the above-described range, it is possible to control the range and the interval dw of the Mg-concentrated region W2 with accuracy. In addition, particularly, when the second angle θ2, which is the spraying angle of the assist gas with respect to the steel sheet surface 2a, is set within the above-described range, it is possible to control the range of the particle existing region W1, and the equivalent circle diameter and the area of the iron-containing particles 6 with accuracy.

In the related art, in a case of forming a groove with laser irradiation, an assist gas is sprayed toward a steel sheet surface to conform to a laser from a direction (sheet thickness direction) that is perpendicular to a steel sheet surface. The present inventors have made a thorough investigation with respect to the configuration in the related art. As a result, they have obtained the following finding. As illustrated in FIG. 13A and FIG. 1313, when a spraying direction of the assist gas 25 is three-dimensionally defined, and the flow rate of the assist gas 25 and the amount of particles in the sheet travelling atmosphere are defined, it is possible to control not only the surface roughness (Ra, RSm) of the groove bottom region 5a but also the range and the interval dw of the Mg-concentrated region W2, the range of the particle existing region W1, and the equivalent circle diameter and the area of the iron-containing particles 6 with accuracy.

In addition, the present inventors have obtained the following finding. When the grain-oriented electrical steel sheet including Configurations A, B, C, and D is manufactured by a novel manufacturing method as described above, the rust resistance of the grain-oriented electrical steel sheet is improved. As a result, the present inventors have accomplished the invention on the basis of the findings. Accordingly, the method of manufacturing the grain-oriented electrical steel sheet according to this embodiment (particularly, the laser irradiation process) is a novel manufacturing method that is not predicted by those skilled in the art, and the grain-oriented electrical steel sheet 1 that is obtained according to the manufacturing method also has novel Configurations A, B, C, and D which are not predicted by those skilled in the art.

Figure 14:
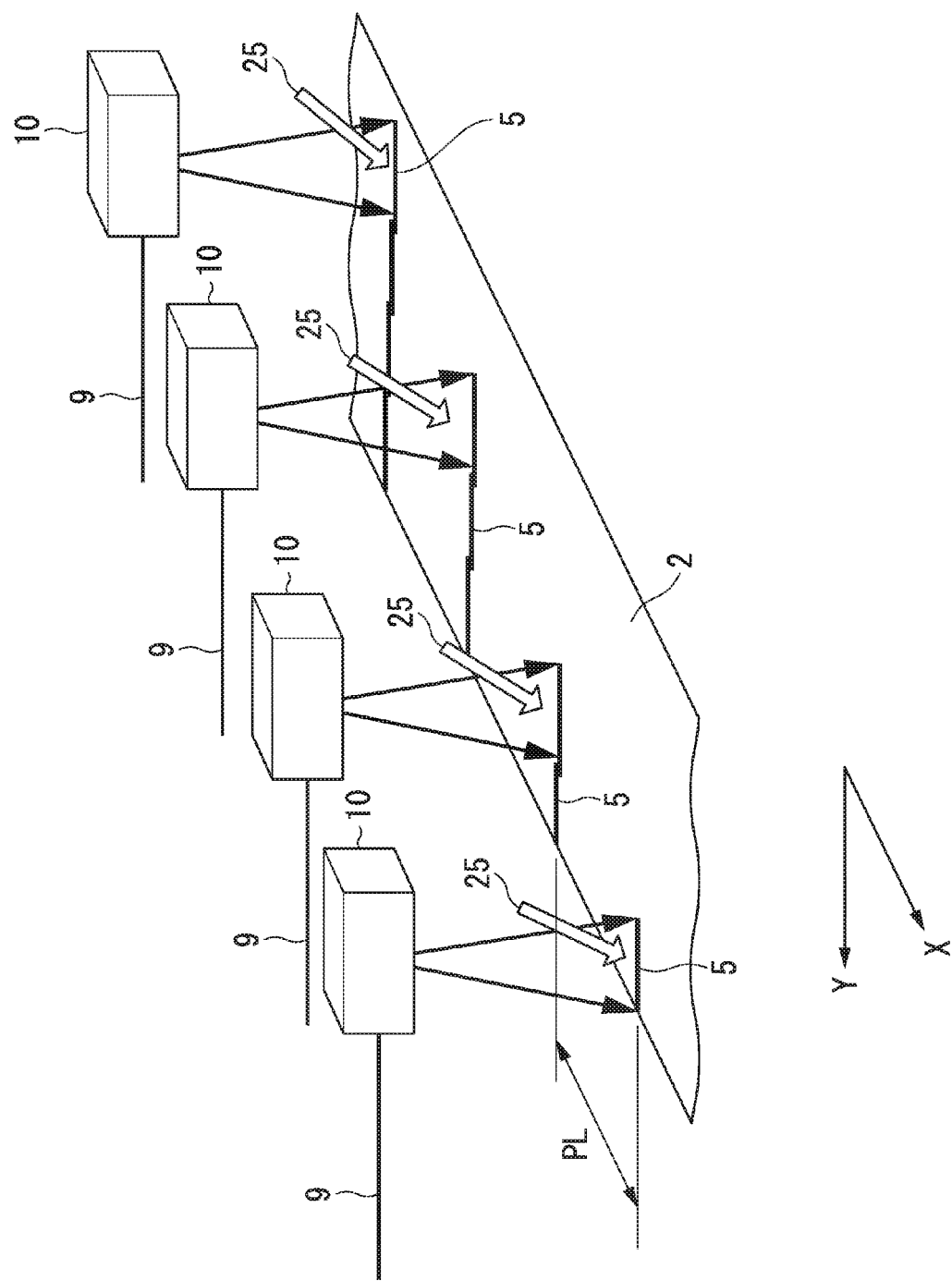
FIG. 14 is a fourth explanatory view related to the laser irradiation process S08 in the manufacturing processes of the grain-oriented electrical steel sheet 1.

In a case where it is difficult to form the groove 5 in the entirety of the steel sheet 2 in the sheet width direction Y with one laser irradiation device 10, as illustrated in FIG. 14, the groove 5 may be formed in the entirety of the steel sheet 2 in the sheet width direction Y by using a plurality of the laser irradiation devices 10. In this case, as illustrated in FIG. 14, the plurality of laser irradiation devices 10 are disposed along the rolling direction X at a predetermined interval. In addition, when seen from the rolling direction X, positions of the respective laser irradiation devices 10 in the sheet width direction Y are set so that laser scanning lines of the respective laser irradiation devices 10 do not overlap each other. When employing the laser irradiation method illustrated in FIG. 14, it is possible to form a plurality of the grooves 5 as illustrated in FIG. 1 in the steel sheet surface 2a.

Returning to FIG. 11, in a final insulating film forming process S09, for example, an insulating coating solution containing colloidal silica and a phosphate is applied to the steel sheet surface 2a, in which the groove 5 is formed in accordance with the laser irradiation process S08, from an upper side of the glass film 3. Then, when a heat treatment is performed under a predetermined temperature condition (for example, 840° C. to 920° C.), it is possible to finally obtain the grain-oriented electrical steel sheet 1 including the steel sheet 2 in which the groove 5 is formed, the glass film 3, the insulating film 4 as illustrated in FIGS. 1 to 3, and Configurations A, B, C, and D.

The steel sheet 2 of the grain-oriented electrical steel sheet 1 manufactured as described above contains, as chemical components in terms of mass fraction, Si: 0.8% to 7%, C: greater than 0% and equal to or less than 0.085%, acid-soluble Al: 0% to 0.065%, N: 0% to 0.012%, Mn: 0% to 1%, Cr: 0% to 0.3%, Cu: 0% to 0.4%, P: 0% to 0.5%, Sn: 0% to 0.3%, Sb: 0% to 0.3%, Ni: 0% to 1%, S: 0% to 0.015%, Se: 0% to 0.015%, and the remainder including Fe and unavoidable impurities.

Furthermore, the embodiment exemplifies a case of employing a manufacturing process in which the groove 5 is formed in the steel sheet surface 2a through laser irradiation before the insulating film 4 is formed in the steel sheet surface 2a, and then the insulating film 4 is formed in the steel sheet surface 2a. This embodiment is not limited thereto, and may employ a manufacturing process in which after the insulating film 4 is formed in the steel sheet surface 2a, the steel sheet surface 2a is irradiated with the laser YL from an upper side of the insulating film 4 to form the groove 5 in the steel sheet surface 2a. In this case, the groove 5 immediately after the laser irradiation is exposed to the outside. Accordingly, it is necessary to form the insulating film 4 on the steel sheet 2 after forming the groove 5. Alternatively, in this embodiment, the glass film 3 or the insulating film 4 may be formed after the groove 5 is formed in the steel sheet 2.

Accordingly, the grain-oriented electrical steel sheet 1, for which high-temperature annealing for secondary recrystallization is completed and coating of the glass film 3 and the insulating film 4 is completed, is included in the grain-oriented electrical steel sheet according to this embodiment, and a grain-oriented electrical steel sheet before completion of coating of the glass film 3 or the insulating film 4 and after formation of the groove 5 is also included in the grain-oriented electrical steel sheet. That is, a final product may be obtained by performing formation of the glass film 3 or the insulating film 4 as a post process by using the grain-oriented electrical steel sheet according to this embodiment. Furthermore, as described above, in a case of removing the glass film 3 or the insulating film 4 from the grain-oriented electrical steel sheet 1 in which the glass film 3 or the insulating film 4 is formed in accordance with the above-described film removing method, it is confirmed that the shape or the roughness of the groove 5 is approximately the same as those before forming the glass film 3 or the insulating film 4.

Furthermore, the embodiment exemplifies a case of performing the laser irradiation process S08 after the final annealing process S07, but the laser irradiation process may be performed between the cold-rolling process S04 and the decarburization annealing process S05. That is, when performing the laser irradiation and the assist gas spraying with respect to the cold-rolled steel sheet that is obtained in the cold-rolling process S04, after forming the groove 5 in the steel sheet surface 2a of the cold-rolled steel sheet, the decarburization annealing may be performed with respect to the cold-rolled steel sheet.

EXAMPLES

Hereinafter, an effect of an aspect of the invention will be described more specifically with reference to examples, but a condition in Examples is one conditional example that is employed to confirm operability and an effect of the invention, and the invention is not limited to the one conditional example. The invention may employ various conditions as long as the object of the invention is accomplished without departing from the gist of the invention.

(Verification 1 of Rust Resistance)

First, the rust resistance of the grain-oriented electrical steel sheet satisfying the following Condition 1 and Condition 2 was verified.

(Condition 1)

In a case where the groove is seen on the longitudinal groove cross-section, the arithmetic average height Ra of the roughness curve, which constitutes the contour of the groove bottom region of the groove, is 1 µm to 3 µm.

(Condition 2)

In a case where the groove is seen on the longitudinal groove cross-section, the average length RSm of the roughness curve element, which constitutes the contour of the groove bottom region of the groove, is 10 µm to 150 µm.

The grain-oriented electrical steel sheet, which was used in Verification 1, was manufactured as follows.

Hot-rolling was performed with respect to a slab having a chemical composition containing, in terms of mass fraction, Si: 3.0%, C: 0.08%, acid-soluble Al: 0.05%, N: 0.01%, Mn: 0.12%, Cr: 0.05%, Cu: 0.04%, P: 0.01%, Sn: 0.02%, Sb: 0.01%, Ni: 0.005%, S: 0.007%, Se: 0.001%, and the remainder including Fe and unavoidable impurities to obtain a hot-rolled steel sheet having the thickness of 2.3 mm.

Subsequently, an annealing treatment was performed with respect to the hot-rolled steel sheet under a temperature condition in which heating was performed at 1000° C. for one minute. Pickling was performed with respect to a surface of the hot-rolled steel sheet that was subjected to the annealing treatment, and then cold-rolling was performed with respect to the hot-rolled steel sheet to obtain a cold-rolled steel sheet having the thickness of 0.23 mm. Subsequently, a decarburization annealing treatment was performed with respect to the cold-rolled steel sheet under a temperature condition in which heating was performed at 800° C. for two minutes, and then an annealing separating agent containing magnesia (MgO) as a main component was applied onto the surface of the cold-rolled steel sheet.

Subsequently, a final annealing treatment was performed with respect to the cold-rolled steel sheet onto which the annealing separating agent was applied under a temperature condition in which heating was performed at 1200° C. for 20 hours. As a result, a cold-rolled steel sheet (steel sheet in which a glass film was formed on a surface thereof), which has the above-described chemical composition and in which a crystal orientation is controlled so that the magnetization easy axis of a crystal grain and the rolling direction match each other, was obtained.

Subsequently, when the steel sheet surface on which the glass film was formed was irradiated with a laser as described above, a plurality of grooves, which extends in a direction perpendicular to the rolling direction, were formed in the steel sheet surface at a predetermined interval along the rolling direction. As laser irradiation conditions, a laser output was set to 200 to 2000 W, a light-condensing spot diameter (86% diameter) of the laser in the rolling direction X was set to 10 to 1000 µm, a light-condensing spot diameter (86% diameter) of the laser in the sheet width direction was set to 10 to 4000 µm, a laser scanning speed was set to 1 to 100 m/s, and a laser scanning pitch was set to 4 to 10 mm.

An assist gas was sprayed to a portion of the steel sheet, which was irradiated with the laser, simultaneously with the laser irradiation. An assist gas spraying angle (first angle θ1) with respect to the laser scanning direction, an assist gas spraying angle (second angle θ2) with respect to the steel sheet surface, and the flow rate of the assist gas were adjusted to satisfy Conditions 1 and 2. Specifically, the first angle θ1 was adjusted in a range of 90° to 180°. The second angle θ2 was adjusted in a range of 1° to 85°. The flow rate of the assist gas was adjusted in a range of 10 liters/minute to 1000 liters/minute. In addition, an atmosphere control was performed so that the amount of particles, which exist in a sheet travelling atmosphere during laser irradiation and have a diameter of 0.5 µm or greater, becomes equal to or greater than 10 pieces and less than 10000 pieces per 1 CF.

As described above, the insulating coating solution containing colloidal silica and a phosphate was applied to the steel sheet in which the groove was formed from an upper side of the glass film, and a heat treatment was performed under a temperature condition in which heating was performed at 850° C. for one minute. According to this, a grain-oriented electrical steel sheet including the steel sheet in which the groove was formed, the glass film, and the insulating film was finally obtained.

The steel sheet (steel sheet in which the groove was formed) in the grain-oriented electrical steel sheet, which was finally obtained, mainly contained Si: 3.0%.

According to the above-described processes, as illustrated in Table 1, grain-oriented electrical steel sheets, which satisfy Condition 1 and Condition 2, were prepared as Examples 1 to 8. In addition, grain-oriented electrical steel sheets, which do not satisfy at least one of Condition 1 and Condition 2, were prepared as Comparative Examples 1 to 4. As described above, in examples, the assist gas spraying angle (first angle θ1) with respect to the laser scanning direction, the assist gas spraying angle (second angle θ2) with respect to the steel sheet surface, and the flow rate of the assist gas and the amount of particles in the sheet travelling atmosphere were adjusted in the above-described ranges described in the embodiment. In comparative examples, these values deviated from the ranges.

Furthermore, the groove bottom region of the groove was specified with respect to the grain-oriented electrical steel sheets corresponding to Examples 1 to 8, and Comparative Examples 1 to 4 in accordance with the specifying method described in the embodiment. A laser type surface roughness measuring device (VK-9700, manufactured by Keyence Corporation) was used for measurement of the surface roughness parameters (Ra, RSm) representing the surface roughness in the groove bottom region. In addition, in this Verification 1, the iron-containing particles, which occur on the steel sheet surface due to formation of the groove before formation of the insulating film, were removed through brushing.

Verification of the rust resistance was performed with respect to each of the grain-oriented electrical steel sheets corresponding to Examples 1 to 8 and Comparative Examples 1 to 4. Specifically, a test piece having a dimension of 30 mm per one side was collected from each of the grain-oriented electrical steel sheets, the test piece was left as it was for one week in an atmosphere of a temperature of 50° C. and a humidity of 91%, and evaluation was made on the basis of a variation of weight of the test piece before left and after being left. When rust occurs, the weight of the test piece increases. Accordingly, as the weight increase amount was smaller, the rust resistance was determined as good. Specifically, the rust resistance of the test piece in which the weight increase amount was 1.0 mg/m$^2$ or less was evaluated as "very good", the rust resistance of the test piece in which the weight increase amount was 5.0 mg/m$^2$ or less was evaluated as "good", and the rust resistance of the test piece in which the weight increase amount was greater than 10.0 mg/m$^2$ was evaluated as "poor". As illustrated in Table 1, from a result of the verification of the rust resistance of the grain-oriented electrical steel sheets corresponding to Examples 1 to 8, since Condition 1 and Condition 2 were satisfied (that is, since Configuration A was employed), it was confirmed that the rust resistance of the grain-oriented electrical steel sheets was improved.

TABLE 1

|  | Ra (µm) | Rsm (µm) | Rust resistance |
| --- | --- | --- | --- |
| Example 1 | 3 | 10 | Good |
| Example 2 | 1.5 | 30 | Good |
| Example 3 | 2.1 | 50 | Good |
| Example 4 | 1.8 | 60 | Good |
| Example 5 | 2.6 | 20 | Good |
| Example 6 | 2.4 | 40 | Good |
| Example 7 | 1.3 | 130 | Good |
| Example 8 | 1 | 150 | Good |
| Comparative Example 1 | 0.8 | 40 | Poor |
| Comparative Example 2 | 4.1 | 10 | Poor |
| Comparative Example 3 | 3.5 | 5 | Poor |
| Comparative Example 4 | 0.8 | 6 | Poor |

For reference, a magnetic characteristic (iron loss W17/50) was measured after the rust resistance test. As a result of the measurement, the iron loss of Examples 1 to 8, of which rust resistance was evaluated as "good", was 0.702 to 0.822 W/kg. An iron loss of Comparative Example 1, of which rust resistance was evaluated as "poor", was 0.951 W/kg. Similarly, an iron loss of Comparative Example 4, of which rust resistance was evaluated as "poor", was 0.794 W/kg. In addition, in Examples 1 to 8, a grain size of a crystal grain, which is in contact with the groove in the steel sheet, was 5 µm or greater. In addition, in Examples 1 to 8, and Comparative Examples 1 to 4, the groove depth D was 5 µm to 40 µm, and the groove width W was 10 µm to 250 µm.

(Rust Resistance Verification 2)

Subsequently, as illustrated in Table 2, a grain-oriented electrical steel sheet, which satisfies Condition 1 and Condition 2 and does not include the glass film, was prepared as Example 9 by using a known manufacturing method. In addition, grain-oriented electrical steel sheets, which do not satisfy at least one of Condition 1 and Condition 2 and do not include the glass film, were prepared as Comparative Examples 5 to 7. The chemical composition of the steel sheets was the same as in Verification 1. As is the case with Verification 1, the assist gas spraying angle (first angle θ1) with respect to the laser scanning direction, the assist gas spraying angle (second angle θ2) with respect to the steel sheet surface, the flow rate of the assist gas 25, and the amount of particles in the sheet travelling atmosphere were adjusted in the ranges described in the embodiment so as to satisfy the Condition 1 and Condition 2.

Verification of the rust resistance was performed with respect to each of the grain-oriented electrical steel sheets corresponding to Example 9 and Comparative Examples 5 to 7 by using the same verification method as in Verification 1. As a result, as illustrated in Table 2, even in a grain-oriented electrical steel sheet that does not include the glass film, it was confirmed that the rust resistance of the grain-oriented electrical steel sheet was improved when employing Configuration A satisfying Condition 1 and Condition 2.

For reference, a magnetic characteristic (iron loss W17/50) was measured after the rust resistance test. As a result of the measurement, the iron loss of Examples 9, of which rust resistance was evaluated as "good", was 0.832 W/kg. An iron loss of Comparative Example 5, of which rust resistance was evaluated as "poor", was 0.925 W/kg. Similarly, an iron loss of Comparative Example 6, of which rust resistance was evaluated as "poor", was 0.736 W/kg. In addition, in Example 9 and Comparative Examples 5 to 7, the groove depth D was 5 μm to 40 μm, and the groove width W was 10 μm to 250 μm.

TABLE 2

|  | Ra (μm) | Rsm (μm) | Rust resistance |
| --- | --- | --- | --- |
| Example 9 | 1.5 | 40 | Good |
| Comparative Example 5 | 1.3 | 7 | Poor |
| Comparative Example 6 | 0.8 | 4 | Poor |
| Comparative Example 7 | 0.6 | 7 | Poor |

(Verification 3 of Rust Resistance)

Subsequently, rust resistance of a grain-oriented electrical steel sheet, which satisfies Condition 3 and Condition 4 to be described below in addition to Condition 1 and Condition 2 described above, was verified.

(Condition 3)

When a region in the glass film and the insulating film, in which the Mg content is an average of 1.3 or more times an average Mg content in the glass film and the insulating film in terms of a mass fraction, is defined as a Mg-concentrated region, in a case where the groove is seen on the transverse groove cross-section that is perpendicular to the groove extension direction, the Mg-concentrated region is included in a region spaced away from a base point that is a boundary between the groove and the steel sheet surface by 0.1 μm to 10 μm in a direction that is perpendicular to the sheet thickness direction and points away from the groove on the transverse groove cross-section.

(Condition 4)

In a case where the groove is seen from the sheet thickness direction (in a plan view of the groove), a distance dw between Mg-concentrated regions adjacent to each other along the groove extension direction is greater than 0 and equal to or less than 100 μm.

As illustrated in Table 3, grain-oriented electrical steel sheets, which satisfy Conditions 1 and 2, and Conditions 3 and 4, were prepared as Examples 10 to 18 by the same process as in Verification 1. In addition, grain-oriented electrical steel sheets, which satisfy Conditions 1 and 2, and do not satisfy at least one of Conditions 3 and 4, were prepared as Examples 19 to 21. As is the case with Verification 1, the assist gas spraying angle (first angle θ1) with respect to the laser scanning direction, the assist gas spraying angle (second angle θ2) with respect to the steel sheet surface, the flow rate of the assist gas, and the amount of particles in the sheet travelling atmosphere were adjusted in the ranges described in the embodiment so as to satisfy Conditions 1 to 4.

Furthermore, in the grain-oriented electrical steel sheets corresponding to Examples 10 to 21, the arithmetic average height Ra of the roughness curve, which constitutes the contour of the groove bottom region, was 2.1 μm, and the average length RSm of the roughness curve element, which constitutes the contour of the groove bottom region of the groove, was 45 μm. In addition, in this Verification 3, the iron-containing particles, which occur on the steel sheet surface due to formation of the groove before formation of the insulating film, were removed through brushing. In addition, analysis of the Mg content was performed by using EPMA.

Verification of the rust resistance was performed with respect to the grain-oriented electrical steel sheets corresponding to Examples 10 to 21 by using the same verification method as in Verification 1. As a result of the verification, as illustrated in Table 3, when satisfying Conditions 3 and 4 in addition to Conditions 1 and 2 (that is, when employing Configurations A and C), it was confirmed that the rust resistance of the grain-oriented electrical steel sheets was further improved.

For reference, a magnetic characteristic (iron loss W17/50) was measured after the rust resistance test. As a result of the measurement, the iron loss of Example 10, of which rust resistance was evaluated as "very good", was 0.836 W/kg. In addition, the iron loss of Example 19, of which rust resistance was evaluated as "good", was 0.701 W/kg. In addition, in Examples 10 to 21, the groove depth D was 5 μm to 40 μm, and the groove width W was 10 μm to 250 μm.

TABLE 3

|  | Range of Mg-concentrated region (μm) | Interval dw of Mg-concentrated region (μm) | Rust resistance |
| --- | --- | --- | --- |
| Example 10 | 3.1 | 30 | Very good |
| Example 11 | 1.5 | 15 | Very good |
| Example 12 | 0.8 | 10 | Very good |
| Example 13 | 0.1 | 1 | Very good |
| Example 14 | 10 | 100 | Very good |
| Example 15 | 8 | 90 | Very good |
| Example 16 | 7 | 60 | Very good |
| Example 17 | 6 | 40 | Very good |
| Example 18 | 1.2 | 5 | Very good |
| Example 19 | 0.05 | 10 | Good |
| Example 20 | 10 | 150 | Good |
| Example 21 | 30 | 160 | Good |

[Verification 4 of Rust Resistance]

Subsequently, the rust resistance of grain-oriented electrical steel sheets, which satisfy Condition 5 and Condition 6 to be described below in addition to Condition 1 and Condition 2 described above, was verified.

(Condition 5)

In a case where the groove is seen on the transverse groove cross-section, when a region, which extends from a base point that is a boundary between the groove and the steel sheet surface by 10 μm to 500 μm in a direction that is perpendicular to the sheet thickness direction and points away from the groove on the transverse groove cross-section, is defined as a particle existing region, the insulating film in the particle existing region includes iron-containing particles.

(Condition 6)

An equivalent circle diameter of the iron-containing particles, which are included in the insulating film in the particle existing region, is 0.1 μm to 2 μm, and a ratio of an area of the iron-containing particles to an area of the particle existing region is equal to or greater than 0.1% and less than 30%

As illustrated in Table 4, grain-oriented electrical steel sheets, which satisfy Conditions 1 and 2, and Conditions 5 and 6, were prepared as Examples 22 to 30 by the same process as in Verification 1. In addition, grain-oriented electrical steel sheets, which satisfy Conditions 1 and 2, and do not satisfy at least one of Conditions 5 and 6, were prepared as Examples 31 to 34. As is the case with Verification 1, the assist gas spraying angle (first angle θ1) with respect to the laser scanning direction, the assist gas spraying angle (second angle θ2) with respect to the steel sheet surface, the flow rate of the assist gas, and the amount of particles in the sheet travelling atmosphere were adjusted in the ranges described in the embodiment so as to satisfy Conditions 1, 2, 5, and 6.

Furthermore, in the grain-oriented electrical steel sheets corresponding to Examples 22 to 34, the arithmetic average height Ra of the roughness curve, which constitutes the contour of the groove bottom region, was 1.9 μm, and the average length RSm of the roughness curve element, which constitutes the contour of the groove bottom region of the groove, was 42 μm.

Verification of the rust resistance was performed with respect to the grain-oriented electrical steel sheets corresponding to Examples 22 to 34 by using the same verification method as in Verification 1. As a result of the verification, as illustrated in Table 4, when satisfying Conditions 5 and 6 in addition to Conditions 1 and 2 (that is, when employing Configurations A and B), it was confirmed that the rust resistance of the grain-oriented electrical steel sheets was further improved.

For reference, a magnetic characteristic (iron loss W17/50) was measured after the rust resistance test. As a result of the measurement, the iron loss of Example 22, of which rust resistance was evaluated as "very good", was 0.823 W/kg. In addition, the iron loss of Example 31, of which rust resistance was evaluated as "good", was 0.718 W/kg. In addition, in Examples 22 to 34, the groove depth D was 5 μm to 40 μm, and the groove width W was 10 μm to 250 μm.

TABLE 4

|  | Range of particle existing region (μm) | Equivalent circle diameter of particle (μm) | Rust resistance |
| --- | --- | --- | --- |
| Example 22 | 100 | 0.2 to 1.5 | Very good |
| Example 23 | 10 | 0.1 to 0.8 | Very good |
| Example 24 | 50 | 0.3 to 2.0 | Very good |
| Example 25 | 400 | 0.1 to 1.0 | Very good |
| Example 26 | 200 | 0.2 to 1.0 | Very good |
| Example 27 | 400 | 0.1 to 0.5 | Very good |
| Example 28 | 450 | 0.1 to 1.5 | Very good |
| Example 29 | 150 | 0.1 to 0.8 | Very good |
| Example 30 | 500 | 0.8 to 2.0 | Very good |
| Example 31 | 350 | 0.05 to 0.2 | Good |
| Example 32 | 350 | 0.05 to 0.75 | Good |
| Example 33 | 5 | 0.2 to 1.5 | Good |
| Example 34 | 800 | 0.05 to 0.15 | Good |

(Verification 5 of Rust Resistance)

Subsequently, the rust resistance of grain-oriented electrical steel sheets, which satisfy Condition 5 and Condition 6 to be described below in addition to Conditions, 1, 2, 3, and 4 described above, was verified.

As illustrated in Table 5, grain-oriented electrical steel sheets, which satisfy Conditions 1, 2, 3, and 4 and satisfy Conditions 5 and 6, were prepared as Examples 35 to 37 by the same process as in Verification 1. In addition, grain-oriented electrical steel sheets, which satisfy Conditions 3, 4, 5, and 6, and do not satisfy at least one of Conditions 1 and 2, were prepared as Examples 38 to 40. In addition, grain-oriented electrical steel sheets, which satisfy Conditions 1, 2, 5, and 6, and do not satisfy at least one of Conditions 3 and 4, were prepared as Examples 41 to 43. In addition, grain-oriented electrical steel sheets, which satisfy Conditions 1, 2, 3, and 4, and do not satisfy at least one of Conditions 5 and 6, were prepared as Examples 44 to 46. As is the case with Verification 1, the assist gas spraying angle (first angle θ1) with respect to the laser scanning direction, the assist gas spraying angle (second angle θ2) with respect to the steel sheet surface, the flow rate of the assist gas, and the amount of particles in the sheet travelling atmosphere were adjusted in the ranges described in the embodiment so as to satisfy Conditions 1, 2, 3, and 4.

Verification of the rust resistance was performed with respect to the grain-oriented electrical steel sheets corresponding to Examples 35 to 46 by using the same verification method as in Verification 1. As a result of the verification, as illustrated in Table 5, when satisfying Conditions 5 and 6 in addition to Conditions 1, 2, 3, and 4 (that is, when employing Configurations A, B, and C), it was confirmed that the rust resistance of the grain-oriented electrical steel sheets was further improved. In addition, in Examples 35 to 46, the groove depth D was 5 μm to 40 μm, and the groove width W was 10 μm to 250 μm.

TABLE 5

|  | Range of particle existing region (μm) | Equivalent circle diameter of particle (μm) | Rust resistance |
| --- | --- | --- | --- |
| Example 35 | 200 | 0.4 to 1.2 | Very good |
| Example 36 | 30 | 0.2 to 2.0 | Very good |
| Example 37 | 100 | 0.5 to 1.4 | Very good |
| Example 38 | 300 | 0.3 to 1.9 | Good |
| Example 39 | 350 | 0.1 to 1.2 | Good |
| Example 40 | 430 | 0.1 to 0.4 | Good |
| Example 41 | 210 | 0.1 to 0.8 | Good |
| Example 42 | 100 | 0.1 to 0.9 | Good |
| Example 43 | 440 | 0.9 to 2.0 | Good |
| Example 44 | 600 | 0.05 to 0.1 | Good |
| Example 45 | 5 | 0.05 to 0.8 | Good |
| Example 46 | 8 | 1.0 to 2.5 | Good |

INDUSTRIAL APPLICABILITY

According to the aspect of the invention, it is possible to improve rust resistance of a grain-oriented electrical steel sheet in which a groove is formed in a surface of a steel sheet for magnetic domain refinement. Accordingly, the invention has sufficient industrial applicability.

BRIEF DESCRIPTION OF THE REFERENCE SYMBOLS

1: GRAIN-ORIENTED ELECTRICAL STEEL SHEET
2: STEEL SHEET
2a: STEEL SHEET SURFACE
2b: STEEL SHEET REGION
3: GLASS FILM
4: INSULATING FILM
5: GROOVE
5a: GROOVE BOTTOM REGION
5b: GROOVE REGION
6: IRON-CONTAINING PARTICLE
BL: GROOVE REFERENCE LINE
LWC: LONGITUDINAL GROOVE WAVING CURVE
SWC: TRANSVERSE GROOVE WAVING CURVE
RC: ROUGHNESS CURVE
W1: PARTICLE EXISTING REGION
W2: Mg-CONCENTRATED REGION
W: GROOVE WIDTH
X: ROLLING DIRECTION
Y: SHEET WIDTH DIRECTION
Z: SHEET THICKNESS DIRECTION

The invention claimed is:

1. A grain-oriented electrical steel sheet, comprising:
a steel sheet having a steel sheet surface in which a groove, which extends in a direction intersecting a rolling direction and of which a groove depth direction matches a sheet thickness direction, is formed,
wherein in a case where the groove is seen on a longitudinal groove cross-section including a groove extension direction and the sheet thickness direction, an arithmetic average height Ra of a roughness curve, which constitutes a contour of a groove bottom region of the groove, is 1 μm to 3 μm, and an average length RSm of a roughness curve element, which constitutes the contour of the groove bottom region, is 10 μm to 150 μm,
the grain-oriented electrical steel sheet further includes an insulating film,
in a case where the groove is seen on a transverse groove cross-section that is perpendicular to the groove extension direction, when a region, which is spaced away from a base point, that is a boundary between the groove and the steel sheet surface, by 10 μm to 500 μm in a direction that is perpendicular to the sheet thickness direction and points away from the groove on the transverse groove cross-section, is defined as a particle existing region, the insulating film in the particle existing region includes iron-containing particles having an equivalent circle diameter of 0.1 μm to 2 μm,
a ratio of an area of the iron-containing particles to an area of the particle existing region is equal to or greater than 0.1% and less than 30%, and
a chemical composition of the iron-containing particles contains 80 to 100 mass % of Fe, and 0 to 10 mass % of Si, and 0 to 10 mass % of Mg.

2. The grain-oriented electrical steel sheet according to claim 1, further comprising:
a glass film that is provided between the steel sheet and the insulating film,
wherein when a region in the glass film and the insulating film, in which a Mg content is an average of 1.3 or more times an average Mg content in the glass film and the insulating film in terms of a mass fraction, is defined as a Mg-concentrated region, in a case where the groove is seen on the transverse groove cross-section that is perpendicular to the groove extension direction, the Mg-concentrated region is included in a region spaced away from a base point, that is a boundary between the groove and the steel sheet surface, by 0.1 μm to 10 μm in a direction that is perpendicular to the sheet thickness direction and points away from the groove on the transverse groove cross-section, and
in a case where the groove is seen from the sheet thickness direction,
the Mg-concentrated region continuously exists along the groove extension direction, or
a plurality of the Mg-concentrated regions exist with an interval along the groove extension direction such that a distance between the Mg-concentrated regions adjacent to each other along the groove extension direction is greater than 0 and equal to or less than 100 μm.

3. The grain-oriented electrical steel sheet according to claim 2,
wherein the glass film having an average thickness of 0 μm to 5 μm and the insulating film having an average thickness of 1 μm to 5 μm are formed on the groove,
the glass film having an average thickness of 0.5 μm to 5 μm and the insulating film having an average thickness of 1 μm to 5 μm are formed on the steel sheet, and
the average thickness of the glass film that is formed on the groove is smaller than the average thickness of the glass film that is formed on the steel sheet.

4. The grain-oriented electrical steel sheet according to claim 1,
wherein in the steel sheet, a grain size of a crystal grain that is in contact with the groove is 5 μm or greater.

* * * * *